US006756711B2

United States Patent
Matsuyama et al.

(10) Patent No.: US 6,756,711 B2
(45) Date of Patent: Jun. 29, 2004

(54) MOTOR HAVING CONTROL CIRCUIT BOARD FOR CONTROLLING ITS ROTATION

(75) Inventors: Youichi Matsuyama, Shinshiro (JP); Tadashi Adachi, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 10/013,510

(22) Filed: Dec. 13, 2001

(65) Prior Publication Data
US 2002/0079758 A1 Jun. 27, 2002

(30) Foreign Application Priority Data

Dec. 27, 2000 (JP) .................................. 2000-397764
Jan. 22, 2001 (JP) .................................. 2001-013266
Apr. 26, 2001 (JP) .................................. 2001-129024

(51) Int. Cl.$^7$ .............................. H02K 5/14; B62D 5/04
(52) U.S. Cl. ................. 310/68 R; 310/71; 310/83; 310/89; 310/DIG. 6; 310/68 B; 74/425
(58) Field of Search .............................. 310/68 R, 89, 310/83, DIG. 6, 71, 68 B

(56) References Cited

U.S. PATENT DOCUMENTS

| | | | | | |
|---|---|---|---|---|---|
| 5,015,897 A | * | 5/1991 | Inagaki et al. | ............... | 310/239 |
| 5,218,255 A | * | 6/1993 | Horiguchi | ............. | 310/40 MM |
| 5,245,258 A | * | 9/1993 | Becker et al. | ................. | 318/10 |
| 5,382,857 A | * | 1/1995 | Schellhorn et al. | ........... | 310/42 |
| 5,528,093 A | * | 6/1996 | Adam et al. | ................... | 310/89 |
| 6,072,254 A | * | 6/2000 | Heib et al. | ................. | 310/68 B |
| 6,129,171 A | * | 10/2000 | Takaoka | ..................... | 180/444 |
| 6,201,326 B1 | * | 3/2001 | Klappenbach et al. | ..... | 310/75 R |
| 2002/0047347 A1 | * | 4/2002 | Torii et al. | ................. | 310/68 B |

FOREIGN PATENT DOCUMENTS

| | | | | |
|---|---|---|---|---|
| DE | 19858627 A1 | * | 6/2000 | ............ H02K/5/14 |
| WO | WO 99/41824 | | 8/1999 | |
| WO | WO 01/61828 | | 8/2001 | |

* cited by examiner

*Primary Examiner*—Nestor Ramirez
*Assistant Examiner*—Heba Elkassabgi
(74) *Attorney, Agent, or Firm*—Posz & Bethards, PLC

(57) ABSTRACT

A motor includes a motor unit and a speed reducing unit. The speed reducing unit has a gear housing. The gear housing includes a circuit board receiving portion and an opening that faces the motor unit. A control circuit board is received in the circuit board receiving portion through the opening in an axial direction of a rotatable shaft. When the motor unit is assembled to the speed-reducing unit, the control circuit board is clamped between the speed-reducing unit and a cover connected to the motor unit.

58 Claims, 13 Drawing Sheets

MOTOR HAVING CONTROL CIRCUIT BOARD FOR CONTROLLING ITS ROTATION

CROSS REFERENCE TO RELATED APPLICATION

This application relates to and incorporates herein by reference Japanese Patent Application No. 2000-397764 filed on Dec. 27, 2000, No. 2001-13266 filed on Jan. 22, 2001, No. 2001-129024 filed on Apr. 26, 2001, and No. 2001-329795 filed on Oct. 26, 2001.

BACKGROUND OF THE INVENTION

1. Field of the Invention

The present invention relates to a motor, more specifically, a motor having a speed reducing mechanism and a control circuit board.

2. Description of Related Art

A motor having a speed reducing mechanism is generally used as a drive source of a power window system of a vehicle. In such a motor, a motor unit is connected to a speed-reducing unit that reduces rotational speed of the motor unit. Further, a control circuit board is accommodated in the motor.

The motor unit includes a yoke housing, which accommodates an armature, magnets and the like. The speed-reducing unit includes a resin-made gear housing that accommodates the speed-reducing mechanism. The yoke housing and the gear housing are connected and fixed to each other with screws. Further, a circuit board housing, which accommodates the control circuit board, is fixed to the gear housing. The circuit board housing having the control circuit board is assembled to the gear housing after the yoke housing and the gear housing are assembled together. Since the assembling process of the circuit board housing is conducted separately from the assembling process of the gear housing and the yoke housing, the entire assembling process of the motor is tedious and time consuming.

SUMMARY OF THE INVENTION

The present invention is made in view of the above disadvantage, and it is an object of the present invention to provide a motor, which includes a motor unit, a gear unit and a control circuit board and allows easier assembly of the motor.

To achieve the objective of the present invention, there is provided a motor that includes a motor unit and a speed reducing unit connected together. The motor unit has a rotatable shaft, and the speed reducing unit has a speed reducing mechanism for reducing rotational speed of the rotatable shaft and a control circuit board for controlling rotation of the motor unit. The speed reducing unit has a gear housing that includes a circuit board receiving portion and an opening. The opening of the gear housing faces the motor unit and is communicated with the circuit board receiving portion. The control circuit board is inserted in the circuit board receiving portion of the gear housing through the opening of the gear housing in an axial direction of the rotatable shaft in such a manner that the control circuit board is clamped between the motor unit and the speed reducing unit when the motor unit and the speed reducing unit are assembled and connected together.

To achieve the objective of the present invention, there may be alternatively provided a motor that includes a motor unit and a speed reducing unit connected together. The motor unit has a rotatable shaft, and the speed reducing unit has a speed reducing mechanism for reducing rotational speed of the rotatable shaft and a control circuit board for controlling rotation of the motor unit. The speed reducing unit has a gear housing that includes a circuit board receiving portion and an opening. The opening of the gear housing faces the motor unit and is communicated with the circuit board receiving portion. The motor unit includes a cover that covers the opening of the gear housing. The cover includes a plurality of motor-side connecting terminals for receiving electrical power supply to the motor unit. The control circuit board includes a plurality of board-side connecting terminals electrically connected to the motor-side connecting terminals.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

A preferred embodiment of the present invention will be described hereinafter with reference to the accompanying drawings.

With reference to FIGS. 1 to 3D, a motor 1 according to the present embodiment is used, for example, as a drive source for driving a power window system of a vehicle. The motor 1 includes a motor unit 2 and a speed reducing unit 3 connected together. The speed reducing unit 3 reduces a rotational speed of the motor unit 2.

Figure 3A:
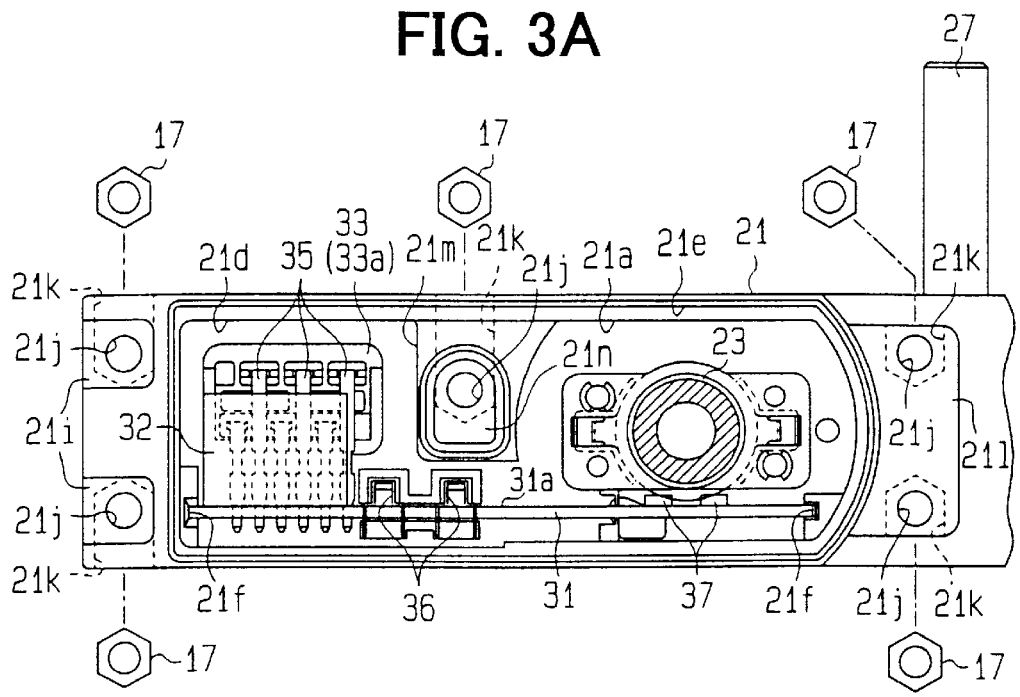
FIG. 3A is a partial schematic end view of a gear housing of the motor seen in a direction of an arrow A in FIG. 1.

The motor unit 2 includes a flat yoke housing 4. As shown in FIG. 3D, the yoke housing 4 has a pair of opposed flat portions (having flat outer side surfaces of the present invention) 4a and a pair of opposed arcuate portions 4b. The flat portions 4a extend in a direction (also referred as a flat direction) of a rotational axis L1 of the motor 1 shown in FIG. 1 and are parallel to each other. The arcuate portions 4b connect the flat portions 4a together. The yoke housing 4 also has a base at one axial end and an opening 4c at the other axial end. The yoke housing 4 is made of a magnetic material. A plurality of magnets 5 are fixed to an inner peripheral wall of the yoke housing 4 at predetermined positions. An armature 6 is rotatably received at radially inward of the magnets 5 in the yoke housing 4. The armature 6 has a rotatable shaft 7. A base end of the rotatable shaft 7 is rotatably supported by a bearing 8 provided at the base of the yoke housing 4. A commutator 9 is fixed at a distal end side of the rotatable shaft 7.

A pair of brush holders 10 is received in the opening 4c of the yoke housing 4. Each brush holder 10 holds a corresponding brush 11, which is in sliding contact with the commutator 9. A bearing 12 is arranged radially inward of the brush holders 10 to rotatably support the distal end side of the rotatable shaft 7. The brush holders 10 are integrated in a cover 13. The cover 13 having the brush holders 10 forms part of the motor unit 2.

The cover 13 is made of resin and is sandwiched between the opening 4c of the yoke housing 4 and an opening 21e of a gear housing 21 (described later) to cover both of the openings 4c and 21e. The cover 13 includes a pair of electrically conductive connecting pieces (motor-side connecting terminals) 14, which extend parallel to the direction (assembling direction of the motor unit 2) of the axis L1 of the motor 1. The connecting pieces 14 are electrically connected to the brushes 11, respectively. The connecting pieces 14 are integrally formed with the cover 13 by insert molding. Further, a seal member 15, made of elastomer resin or the like, is integrally formed with the cover 13 by double-shot molding.

Figure 2:
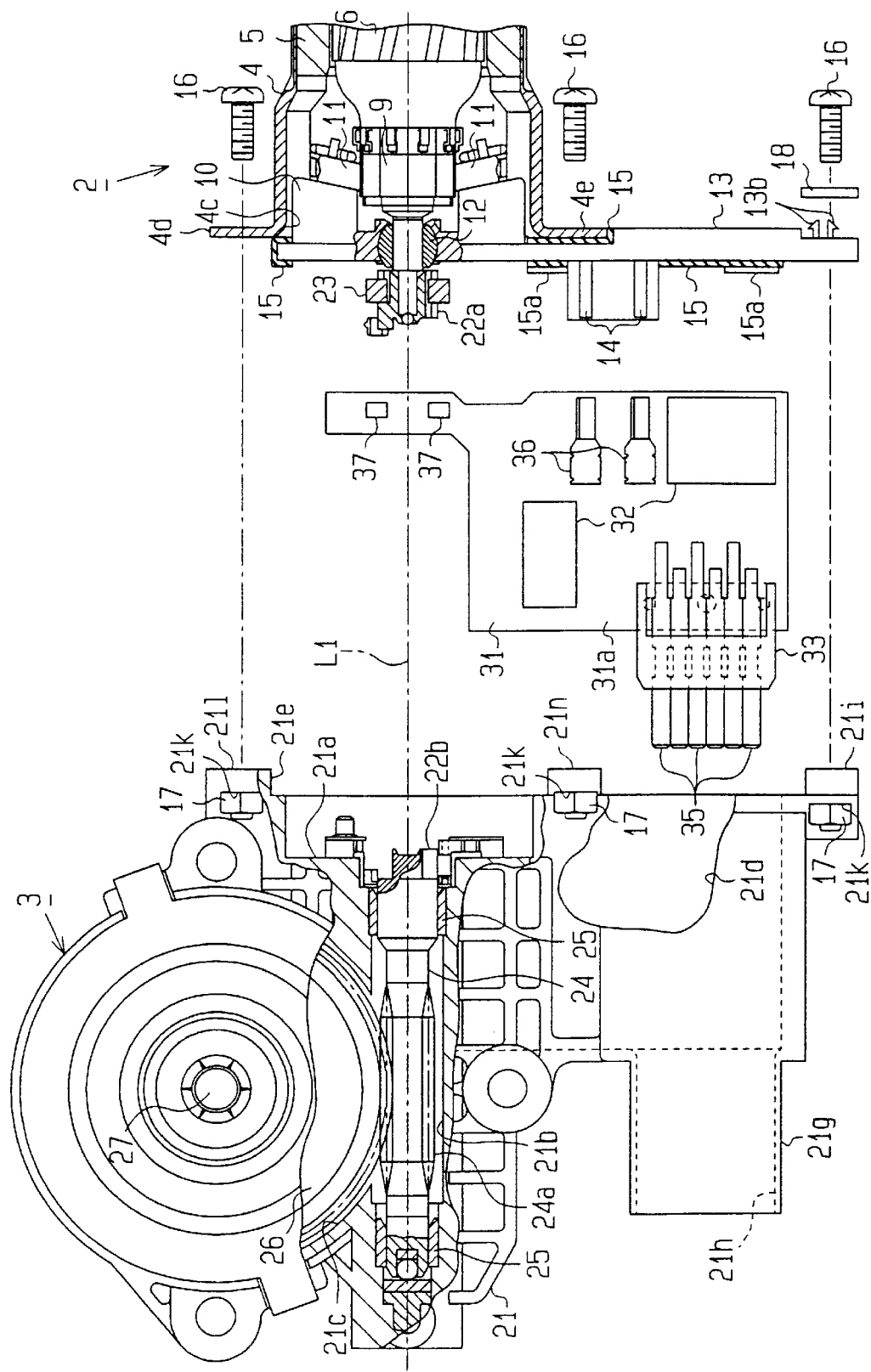
FIG. 2 is an exploded partial view of the motor shown in FIG. 1.
Figure 5:
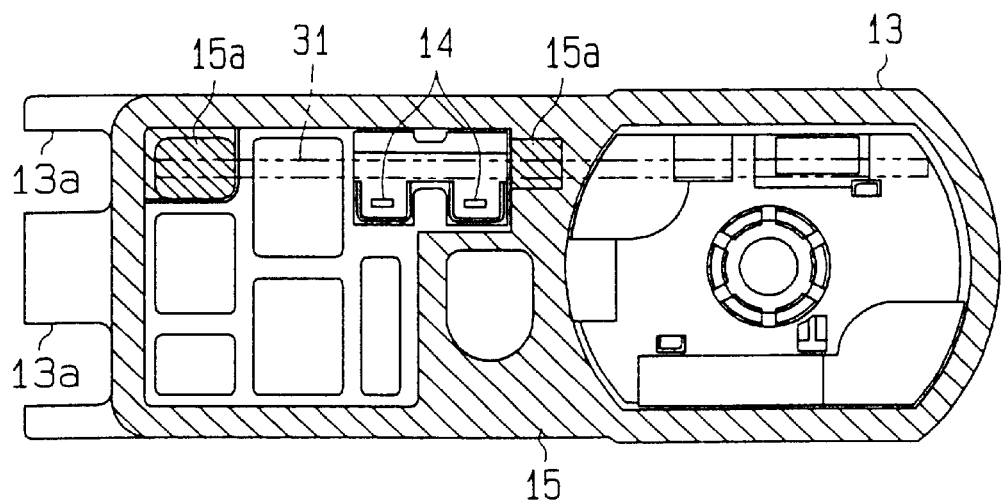
FIG. 5 is a view of the cover seen from the gear housing side.

The seal member 15 is provided at a predetermined position to fully close or seal the opening 4c of the yoke housing 4 and the opening 21e of the gear housing 21. That is, the seal member 15 can prevent penetration of water into the opening 4c of the yoke housing 4 and also into the opening 21e of the gear housing 21. Further, the cover 13 fully closes the opening 4c of the yoke housing 4. Thus, brush powder, which is generated from the brushes 11 during sliding movement of the brushes 11 along the commutator 9, is prevented from being scattered over a clutch 22 (described later) and a control circuit board 31 (described later). As a result, abnormal operation of the motor 1 due to the scattered brush powder is prevented. Also, as shown in FIGS. 2 and 5, the seal member 15 has pressing protrusions 15a that are provided at two predetermined positions, respectively. Each pressing protrusion 15a acts as a pressing portion of the present invention that resiliently urges an end surface of the control circuit board 31 in a direction away from it.

The cover 13 is installed in the opening 21e of the gear housing 21 after the brush holders 10 of the cover 13 are installed in the yoke housing 4. Then, the yoke housing 4 is fixed to the gear housing 21 with screws 16 and nuts 17 at three predetermined positions while the cover 13 is sandwiched between the yoke housing 4 and the gear housing 21. Further, the cover 13 is fixed to the gear housing 21 with screws 16 and nuts 17 at two predetermined positions apart from the yoke housing 4. In this case, a part of the cover 13 is sandwiched between a metal plate 18 and the gear housing 21 and is fixed thereat with the screws 16 and the nuts 17.

Figure 1:
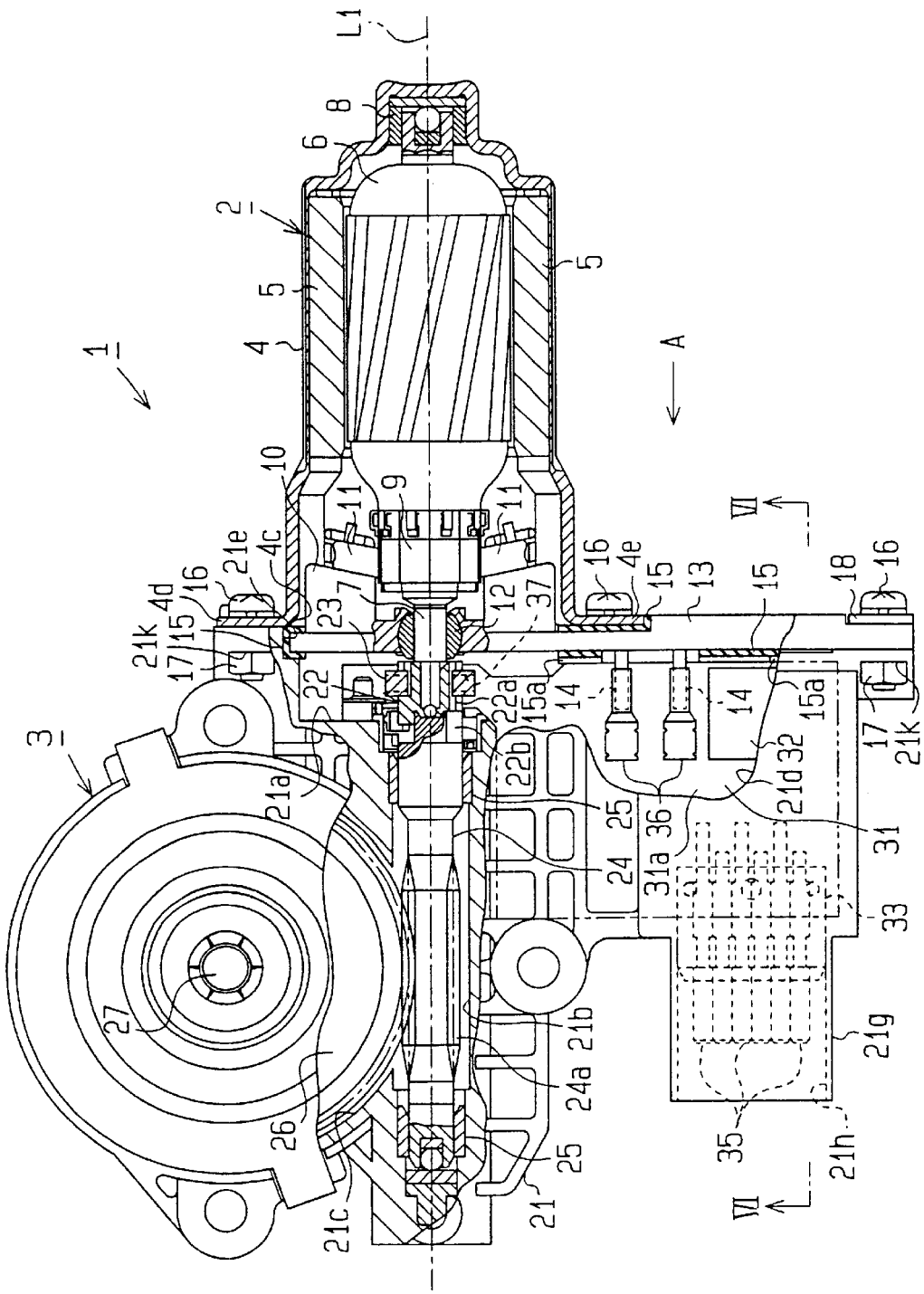
FIG. 1 is a schematic view of a motor according to one embodiment of the present invention.

FIGS. 3A to 3D show various views seen in a direction of an arrow A in FIG. 1 and show positional relationship or alignment of the gear housing 21, the cover 13, the metal plate 18 and the yoke housing 4 of the motor 1. With reference to these drawings, the securing portions of the yoke housing 4 will be described below. First, one securing portion of the yoke housing 4, which is located on the right side in FIG. 3D, will be described. The gear housing 21 has a securing portion 21l at one lateral side (right side of FIG. 3A) for joining with one lateral side (right side in FIG. 3D) of the yoke housing 4. The securing portion 21l has two through holes 21j at top and bottom sides of the securing portion 21l in FIG. 3A, respectively. Each through hole 21j extends in the direction of the axis L1 of the motor 1 and receives the corresponding screw 16. Further, each through hole 21j is communicated with a corresponding nut retaining hole 21k, which is formed in an outer peripheral surface of the gear housing 21 (the securing portion 21l) and receives the corresponding nut 17.

Next, another securing portion of the yoke housing 4, which is located on the left side in FIG. 3D, will be described. In the opening 21e of the gear housing 21, the gear housing 21 has another securing portion 21m for joining with the other lateral side (left side in FIG. 3D) of the yoke housing 4. The securing portion 21m is positioned generally at a widthwise center (i.e., the center in the left-right direction in FIG. 3A) of the opening 21e of the gear housing 21 and extends downwardly from the top side of the gear housing 21 toward a center of the gear housing 21 in FIG. 3A. The securing portion 21m has a projection 21n generally at a vertical center of the opening 21e in FIG. 3A. The projection 21n extends in the direction of the axis L1 toward the yoke housing 4. A through hole 21j for receiving a screw 16 is formed in the projection 21n to extend in the direction of the axis L1. Further, the through hole 21j of the projection 21n of the securing portion 21m is communicated with a nut retaining hole 21k that is formed in the outer peripheral surface of the gear housing 21.

Figure 3B:
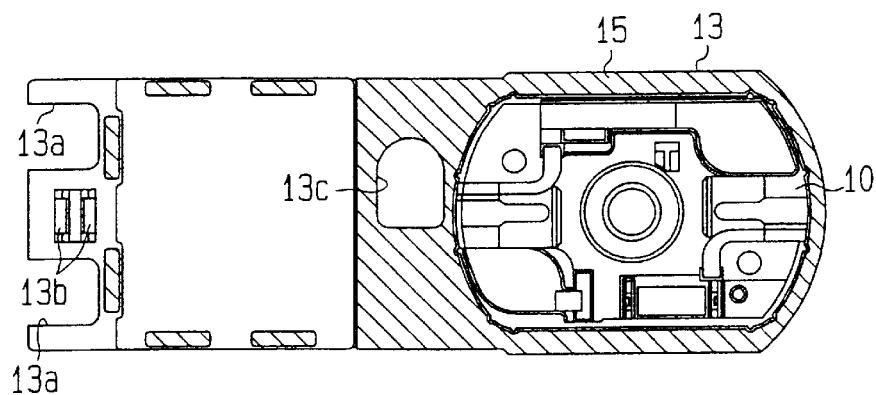
FIG. 3B is a schematic end view of a cover of the motor seen in the direction of the arrow A in FIG. 1.
Figure 3C:
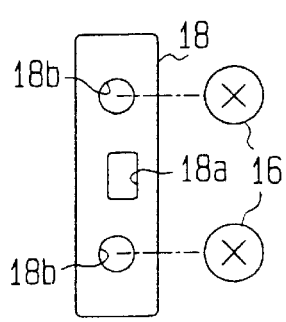
FIG. 3C is a schematic end view of a metal plate and removed screws of the motor seen in the direction of the arrow A in FIG. 1.
Figure 3D:
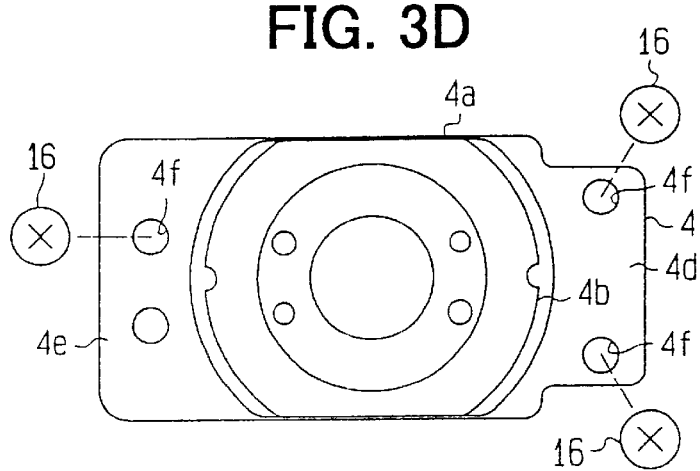
FIG. 3D is a schematic end view of a yoke housing of the motor seen in the direction of the arrow A in FIG. 1.

As shown in FIG. 3B, the cover 13 has an engaging hole 13c, which is located generally at the center of the cover 13 and is engaged with the projection 21n of the gear housing 21. The seal member 15 entirely covers an inner peripheral surface of the engaging hole 13c of the cover 13.

As shown in FIG. 3D, the yoke housing 4 has a pair of securing segments 4d and 4e. The securing segments 4d and 4e are aligned with the securing portions 21l and 21m, respectively, and are located at the right side and the left side of the yoke housing 4, respectively, in FIG. 3D. The securing segment 4d has a couple of through holes 4f, which are aligned with the through holes 21j of the securing portion 21l of the gear housing 21, respectively. The securing segment 4e has a through hole 4f, which is aligned with the through hole 21j of the securing portion 21m of the gear housing 21.

During assembly, the cover 13 and the yoke housing 4 are fixed to the gear housing 21 in the following manner. First, the cover 13 is attached to the yoke housing 4. Then, the cover 13 attached to the yoke housing 4 is engaged with the opening 21e of the gear housing 21, so that the projection 21n of the gear housing 21 engages with the engaging hole 13c of the cover 13, and the through holes 4f of the yoke housing 4 are aligned with the corresponding through holes 21j of the gear housing 21. Next, the screws 16 are inserted into the corresponding through holes 4f and 21j and are threadably engaged with the corresponding nuts 17 retained in the nut retaining holes 21k. Thus, the yoke housing 4 is tightly fixed to the gear housing 21 while sandwiching the cover 13 therebetween. At this time, as shown in FIG. 1, the seal member 15 of the cover 13 is compressively deformed upon tightening of the screws 16, so that the opening 21e of the gear housing 21 and the opening 4c of the yoke housing 4 are securely sealed. Further, since the seal member 15 entirely covers the inner peripheral surface of the engaging hole 13c of the cover 13, the seal member 15 located over the inner peripheral surface of the engaging hole 13c is tightly engaged with the outer peripheral surface of the projection 21n of the gear housing 21 when the cover 13 is fixed to the gear housing 21. Therefore, no clearance or space remains between the engaging hole 13c and the projection 21n.

In this case, as shown in FIG. 3A, the control circuit board 31 is arranged at a lower part of the opening 21e of the gear housing 21 such that a longitudinal direction of the control circuit board 31 is generally parallel to the longitudinal direction of the opening 21e (left-right direction in FIG. 3A). The control circuit board 31 is positioned laterally outward of the yoke housing 4 in the direction perpendicular to the axis L1 of the motor 1. The yoke housing 4 and the cover 13 are fixed to the gear housing 21 with the screw 16 generally at the center of the opening 21e, i.e., at the through hole 4f of the securing segment 4e of the yoke housing 4, which is positioned apart from the control circuit board 31 in the direction perpendicular to the plane of the control circuit board 31. Therefore, the cover 13 is securely fixed to the gear housing 21 without tilting relative to the gear housing 21, and the yoke housing 4 is securely fixed to the cover 13 without tilting relative to the cover 13. Also, since this securing position is located gear housing 21, the cover 13 is effectively restrained from tilting relative to the gear housing 21. In this way, the gear housing 21 and the yoke housing 4 are firmly sealed with the cover 13, thereby preventing entering of dust and liquid, such as water, into the gear housing 21 and the yoke housing 4.

Figure 4A:
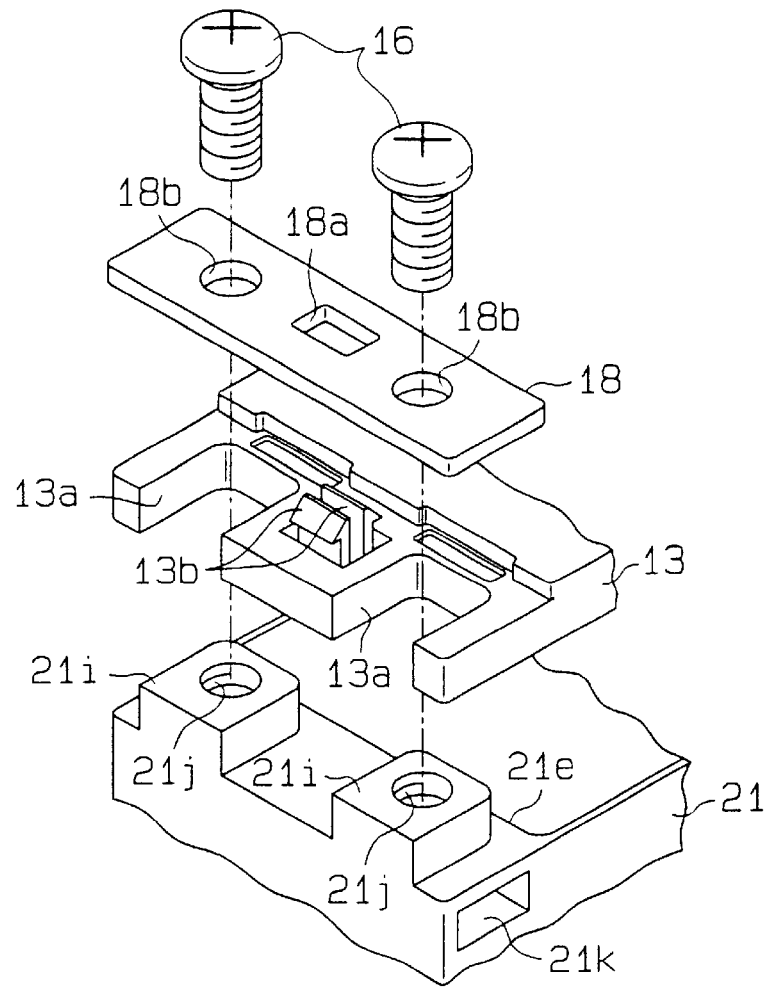
FIG. 4A is an exploded partial perspective view of one securing portion of the motor.

The securing portion located at the left side of the gear housing 21 in FIG. 3A will be described hereinafter. As shown in FIG. 4A, the gear housing 21 has two projections 21i projecting in the direction of the axis L1. The projections 21i are positioned at the left side (in FIG. 3A) of the gear housing 21 proximate to the opening 21e. Each projection 21i has a through hole 21j, which extends in the direction of the axis L1 and receives the corresponding screw 16. Also, each through hole 21j is communicated with a corresponding nut retaining hole 21k, which is formed in the outer peripheral surface of the gear housing 21 and receives the corresponding nut 17. The cover 13 includes a couple of notches 13a, which engage with the projections 21i of the gear housing 21, respectively. A pair of engaging claws 13b is provided in the cover 13 between the notches 13a on the side, to which the metal plate 18 is fixed. The metal plate 18 has an engaging hole 18a for engaging with the engaging claws 13b. The metal plate 18 also has through holes 18b to be aligned with the through holes 21j of the projections 21i, respectively. That is, the single metal plate 18 is used for the two through holes 21j.

Figure 4B:
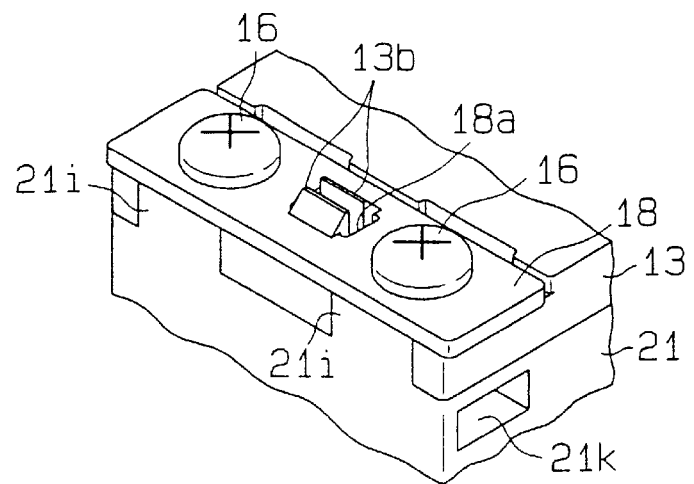
FIG. 4B is a perspective partial view of the securing portion in an assembled state.

During the assembly, as shown in FIG. 4A, the cover 13 is arranged in the opening 21e of the gear housing 21, so that the projections 21i of the gear housing 21 engage with the corresponding notches 13a of the cover 13. Then, the metal plate 18 is fixed to the cover 13 so that the engaging claws 13b of the cover 13 engage with the engaging hole 18a of the metal plate 18. At this stage, the metal plate 18 is temporarily fixed to the cover 13. Then, as shown in FIG. 4B, each screw 16 is screwed into the corresponding through holes 18b and 21j and is securely, threadably engaged with the nut 17 positioned in the corresponding nut retaining hole 21k. Therefore, the cover 13 is tightly fixed to the gear housing 21. Moreover, as shown in FIG. 1, the seal member 15 of the cover 13 is compressively deformed by tightening of the screws 16, so that the opening 21e of the gear housing 21 is fully sealed.

The metal plate 18 is relatively rigid and has a relatively large contact area that contacts the cover 13 in a tightening direction of the screw 16. Therefore, the cover 13 is not readily deformed upon tightening of the screws 16, and the screws 16 and the nuts 17 are not readily loosened. As a result, the sealing state of the opening 21e of the gear housing 21 can be maintained. Further, in the present embodiment, since the metal plate 18 is temporarily fixed to the cover 13 before it is completely fixed to the cover 13 with the screws 16, the screwing operation of the screws 16 is facilitated and is simplified. Therefore, the assembling of the motor 1 is improved.

The speed-reducing unit 3 has the gear housing 21 made of a resin material. The gear housing 21 includes a rotatable shaft receiving portion 21a, a worm shaft receiving portion 21b, a worm wheel receiving portion 21c and a circuit board receiving portion 21d. The worm shaft receiving portion 21b is communicated with the rotatable shaft receiving portion 21a and extends in the direction of the axis L1. The worm wheel receiving portion 21c is communicated with the worm shaft receiving portion 21b and extends in a direction perpendicular to the direction of the axis L1, i.e., in the flat direction of the flat portion 4a of the yoke housing 4. The circuit board receiving portion 21d is communicated with the rotatable shaft receiving portion 21a and extends on the opposite side of the worm shaft receiving portion 21b (axis L1) with respect to the worm wheel receiving portion 21c. The opening 21e of the gear housing 21 forms an opening of the rotatable shaft receiving portion 21a and also an opening of the circuit board receiving portion 21d.

The clutch 22 includes a driving-side portion 22a, which is integrally, rotatably connected to the distal end of the rotatable shaft 7 in the rotatable shaft receiving portion 21a. The driving-side portion 22a is fixed to the distal end of the rotatable shaft 7 after installation of the magnets 5 and the armature 6 in the yoke housing 4 and fixation of the cover 13 (brush holders 10) to the yoke housing 4. A sensor magnet 23 for detecting rotation of the rotatable shaft 7 is fixed at a predetermined position of the driving-side portion 22a.

The clutch 22 also includes a driven-side portion 22b, which is integrally, rotatably connected to a worm shaft 24 (described later). The clutch 22 transmits rotational force of the driving-side portion 22a to the driven-side portion 22b but prevents transmission of rotational force from the driven-side portion 22b to the driving-side portion 22a. That is, the rotational force of the rotatable shaft 7 generated upon operation of the motor unit 2 is transmitted to the worm shaft 24 through the clutch 22. However, the rotational force of the worm shaft 24 is not transmitted to the rotatable shaft 7. The driving-side portion 22a and the driven-side portion 22b of the clutch 22 are assembled together to connect between the rotatable shaft 7 and the worm shaft 24 when the motor unit 2 and the speed reducing unit 3 are assembled together.

The worm shaft 24 has a worm 24a and is rotatably supported by a pair of bearings 25 in the worm shaft receiving portion 21b. The driven-side portion 22b of the clutch 22 is integrally, rotatably connected to the base end portion of the worm shaft 24.

The worm wheel 26 is meshed with the worm 24a and is accommodated in the worm wheel receiving portion 21c in a rotatable manner. Further, an output shaft 27, which is connected to a window regulator (not shown) of the power window system, is fixed to the center of the worm wheel 26. When the rotational force of the worm shaft 24 is transmitted to the output shaft 27 through the worm wheel 26, the window regulator is operated.

Figure 6:
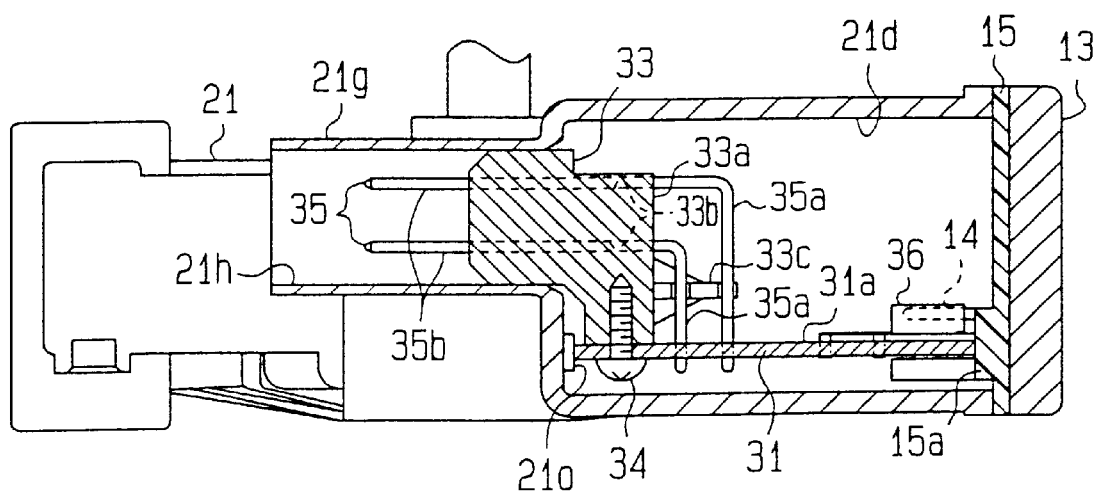
FIG. 6 is a partial cross-sectional view taken along line VI—VI in FIG. 1.

The control circuit board 31 is accommodated in the circuit board receiving portion 21d. The control circuit board 31 has a control circuit 32 for controlling rotation of the motor 1. As shown in FIG. 3A, the circuit board receiving portion 21d has a couple of guide grooves 21f, which extend parallel to the direction of the axis L1 and guide corresponding edges of the control circuit board 31. The control circuit board 31 is inserted into the circuit board receiving portion 21d along the guide grooves 21f, so that a component mounting surface 31a of the control circuit board 31, which supports the control circuit 32 and the like, is arranged parallel to the flat direction of the flat portions 4a of the yoke housing 4. Then, as shown in FIG. 6, when the cover 13 is fixed to the gear housing 21 to assemble the motor unit 2 and the speed reducing unit 3 together, the control circuit board 31 is clamped between the pressing protrusions 15a of the seal member 15 of the cover 13 and a bottom surface 21o of the circuit board receiving portion 21d (i.e., is clamped between the motor unit 2 and the speed reducing unit 3) in such a manner that the pressing protrusions 15a resiliently urge an axial end surface of the control circuit board 31 in a direction away from the pressing protrusions 15a. Accordingly, the control circuit board 31 is securely installed in the gear housing 2.

Figure 8:
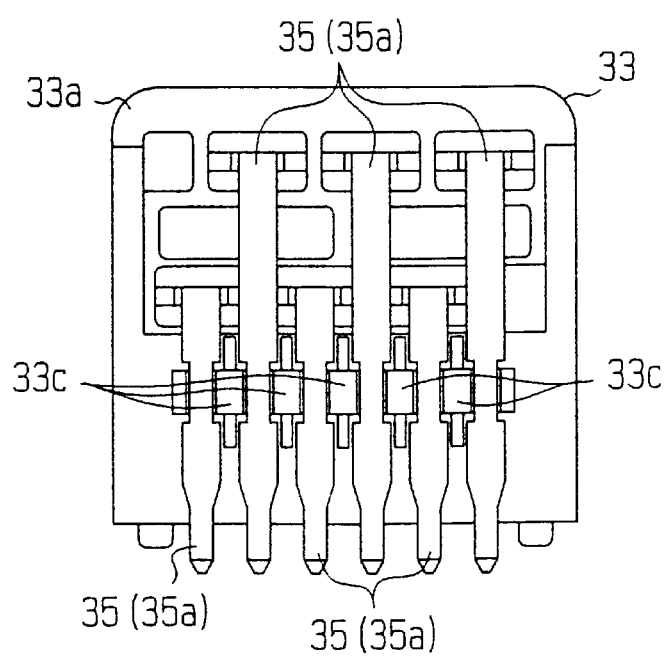
FIG. 8 is an enlarged rear view of a connector base portion.

With reference to FIG. 6, a connector base portion 33 is fixed to the control circuit board 31 with a screw 34. The connector base portion 33 supports six terminals 35 at predetermined positions. A base end portion 35a of each terminal 35 is electrically connected to the control circuit 32 of the circuit board 31 and protrudes from the circuit board 31 in the direction perpendicular to the plane of the circuit board 31. A distal end portion 35b of each terminal 35 is bent relative to the base end portion 35a of the terminal 35 and extends parallel to the plane of the circuit board 31 toward a back face 33a of the connector base portion 33 and is received through a corresponding through hole 33b that penetrates through the connector base portion 33. As shown in FIGS. 6 and 8, a guide 33c for limiting position of each terminal 35 is provided on the back face 33a of the connector base portion 33. As a result, each terminal 35 is restricted from deviating from its predetermined position, thus preventing deformation of the terminal 35.

With reference to FIGS. 1 and 2, the gear housing 21 includes a connector portion 21g, which extends in the direction of the axis L1 of the motor 1 and is connected to a vehicle-side connector (not shown). The connector portion 21g includes a communicating hole 21h, which extends in the direction of the axis L1 and communicates between the circuit board receiving portion 21d and the outside of the connector portion 21g. The connector base portion 33 is inserted into the communicating hole 21h, so that the distal end portions 35b of the terminals 35 are exposed in the communicating hole 21h. Further, the connector portion 21g is connected to the vehicle-side connector so that electrical power and control signals are supplied to the control circuit 32 from the vehicle-side connector through the terminals 35.

Figure 7:
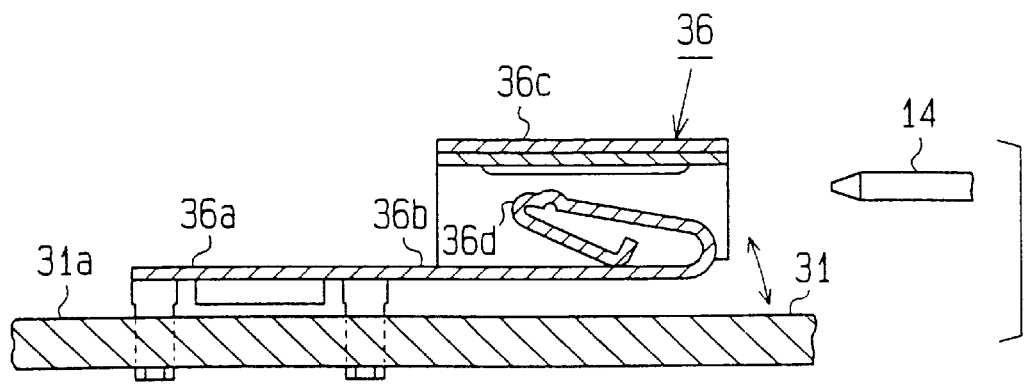
FIG. 7 is an enlarged schematic cross-sectional view, showing a female terminal and a connecting piece to be received in the female terminal.

A pair of female terminals (board-side connecting terminals) 36 is attached to the control circuit board 31. The female terminals 36 are electrically connected to the connecting pieces 14 of the cover 13, respectively. As shown in FIG. 7, each female terminal 36 includes a base portion 36a, a leaf spring portion 36b and a connecting portion 36c. The base portion 36a is fixed to the circuit board 31 and is electrically connected to the control circuit 32. The leaf spring portion 36b extends from the base portion 36a and can be resiliently flexed in the direction perpendicular to the plane of the circuit board 31. The connecting portion 36c extends from the leaf spring portion 36b and is shaped into a tubular-shape. The connecting portion 36c includes a resilient piece 36d disposed therein to resiliently hold the corresponding connecting piece 14 inserted in the connecting portion 36c. The resilient piece 36d is formed by folding it in such a manner that an entry side of the resilient piece 36d, from which the connecting piece 14 is inserted into the connecting portion 36c of the female terminal 36, provides a wider opening in the connecting portion 36c in comparison to the other side (left side in FIG. 7). Each female terminal 36 can be formed by cutting a piece of plate material into a predetermined shape, for example, through a stamping process and then bending it to the specified shape.

When the cover 13 is fixed to the gear housing 21 (speed-reducing unit 3), the connecting pieces 14 are inserted into the female terminals 36 to form an electrical connection therebetween. At this time, even if the connecting pieces 14 are deviated from the predetermined position in the direction perpendicular to the plane of the circuit board 31 due to size variation, each connecting piece 14 is readily inserted into the corresponding female terminal 36 because of the wider opening of the connecting portion 36c at the entry side thereof. Further, since the size variation of each connecting piece 14 can be compensated by the resilient flexing action of the leaf spring portion 36b, each connecting piece 14 is prevented from being deformed. Furthermore, each female terminal 36 and the corresponding connecting piece 14 are securely, electrically connected together because of the resiliency of the resilient piece 36d of the female terminal 36.

As shown in FIGS. 1 to 3A, a pair of Hall elements 37 is provided on the control circuit board 31 to oppose the outer peripheral surface of the sensor magnet 23. The Hall elements 37 detect changes in a magnetic field produced by the sensor magnet 23, which integrally rotates with the rotatable shaft 7, and output signals indicative of the detected changes in the magnetic field to the control circuit 32. The control circuit 32 obtains information of the rotation of the rotatable shaft 7, such as a rotational speed of the rotatable shaft 7, based on the detected signals transmitted from the Hall elements 37. The control circuit 32 supplies control signals and driving electric current to the brushes 11 from the female terminals 36 through the connecting pieces 14. The control signals are fed from the vehicle side to the control circuit 32 through the connector portion 21g. The driving electric current is provided based on the information of the rotation of the rotatable shaft 7. Therefore, the motor unit 2 is driven to operate the window regulator.

Characteristic advantages of the above-described embodiment will be described below.

(1) The gear housing 21 includes the circuit board receiving portion 21d and the opening 21e that faces the motor unit 2. The circuit board receiving portion 21d receives the control circuit board 31 through the opening 21e in the direction of the axis L1. When the motor unit 2 is assembled with the speed reducing unit 3, the control circuit board 31 is clamped between the motor unit 2 (the cover 13) and the speed reducing unit 3. Thus, the control circuit board 31 is secured in the circuit board receiving portion 21d simply by inserting the control circuit board 31 into the circuit board receiving portion 21d and then assembling the motor unit 2 and the speed reducing unit 3 together. Accordingly, the assembling of the motor 1 is simplified.

(2) The rotatable shaft 7 and the worm shaft 24 are connected together through the clutch 22 simply by connecting the motor unit 2 and the speed reducing unit 3 together. Thus, the assembling of the motor 1 is simplified.

(3) The clutch 22 is provided between the rotatable shaft 7 and the worm shaft 24. The clutch 22 transmits the rotational force of the rotatable shaft 7 to the worm shaft 24 but prevents the transmission of the rotational force of the worm shaft 24 to the rotatable shaft 7. Therefore, the motor 1 is not rotated by rotational force transmitted from the window regulator side (load side) to the output shaft 27 of the motor 1. Accordingly, a window glass is effectively prevented from moving downward, for example, by its own weight or its vibrations.

(4) The gear housing 21 includes the circuit board receiving portion 21d and the worm wheel receiving portion 21c. The circuit board receiving portion 21d and the worm wheel receiving portion 21c are arranged on opposed sides of the rotational axis L1 of the rotatable shaft 7, respectively. Since the control circuit board 31 received in the circuit board receiving portion 21d is not overlapped with the worm wheel 26 received in the worm wheel receiving portion 21c in the direction perpendicular to the plane of the control circuit board 31, a profile of the motor 1 is advantageously reduced.

(5) The motor unit 2 (cover 13) has the connecting pieces 14 for receiving the electrical power supply, and the control circuit board 31 has female terminals 36 for electrically connecting with the connecting pieces 14. The connecting pieces 14 and the female terminals 36 are electrically connected together simply by connecting the motor unit 2 (cover 13) and the speed reducing unit 3 together. In this way, the connecting pieces 14 are readily connected to the female terminals 36, and it is unnecessary to provide an additional process to connect the connecting pieces 14 and the female terminals 36 together. Accordingly, the assembling of the motor 1 is simplified.

(6) The connecting pieces 14 are integrally formed with the cover 13 by insert molding. Accordingly, no dedicated component is required to fix the connecting pieces 14 to the cover 13, thereby reducing the number of components.

(7) The motor unit 2 (yoke housing 4) is flat shaped, and the plane of the control circuit board 31 is generally parallel to the flat direction of the motor unit 2 (the flat portions 4a of the yoke housing 4). Thus, it is possible to reduce the profile of the motor 1.

(8) The gear housing 21 has the connector portion 21g integrated therein for supplying the electric power to the motor unit 2. In this manner, the number of components is reduced.

(9) The connector portion 21g extends parallel to the direction of the axis L1 of the rotatable shaft 7. Therefore, the connector portion 21g is readily connected to the vehicle-side connector even if the vehicle-side connector is located on either side of the connector portion 21g in the direction perpendicular to the direction of the axis L1.

(10) The connector portion 21g is continuously formed with circuit board receiving portion 21d. Since the control circuit board 31 received in the circuit board receiving portion 21d needs to be electrically connected to the terminals 35 of the connector portion 21g, the connector portion 21g extends continuously from the circuit board receiving portion 21d. Thus, connection between the control circuit board 31 and the terminals 35 is eased.

(11) The opening 21e of the gear housing 21 forms the opening of the circuit board receiving portion 21d and also the opening of the rotatable shaft receiving portion 21a. Furthermore, the opening 21e is closed with the single cover 13. Therefore, the number of the components and the number of the assembling processes are reduced.

(12) The brush holders 10 are formed integrally with the cover 13. Thus, the number of the components and the number of the assembling processes are reduced.

(13) The resilient seal member 15, which seals the opening 4c of the yoke housing 4 and the opening 21e of the gear housing 21, is formed integrally with the cover 13. Therefore, the number of the components and the number of the assembling processes are reduced.

(14) The seal member 15 has the pressing protrusions 15a, which urge the control circuit board 31 in a direction away from the pressing protrusions 15a when the motor unit 2 is assembled with the speed-reducing unit 3. Therefore, chattering of the control circuit board 31 is effectively prevented. Further, the pressing protrusions 15a are formed integrally with the seal member 15. Thus, the number of the components and the number of the manufacturing processes are reduced.

(15) The cover 13 is clamped between the opening 4c of the yoke housing 4 and the opening 21e of the gear housing 21 and seals the opening 21e of the gear housing 21, which is located outside of the yoke housing 4. The yoke housing 4 includes the securing segments 4d and 4e to be fixed to the gear housing 21 with the screws 16. The securing segments 4d and 4e are positioned at the lateral sides (left and right sides in FIG. 3D) of the yoke housing 4, which are spaced away from each other in the direction perpendicular to the direction of the axis L1, i.e., in the longitudinal direction of the control circuit board 31 (the longitudinal direction of the opening 21e of the gear housing 21). Furthermore, at the securing segment 4e, the other securing position using the screw 16 is formed generally at the vertical center of the opening 21e of the gear housing 21, which is centered in the direction (vertical direction in FIG. 3A) perpendicular to the longitudinal direction of the circuit board 31 (longitudinal direction of the opening 21e). The circuit board 31 is located on the one side (lower side in FIG. 3A) of the rotatable shaft 7. Thus, the other securing position on the securing segment 4e is placed away from the circuit board 31. Furthermore, the other securing position on the securing segment 4e is located generally at the center of the opening 21e of the gear housing 21. Thus, the cover 13 is securely fixed to the gear housing 21 without tilting relative to the gear housing 21, and the yoke housing 4 is securely fixed to the cover 13 without tilting relative to the cover 13. As a result, the effective seal between the cover 13 and the housings 4, 21 is established, thus preventing penetration of the liquid, such as the water, or dust into the housings 4 and 21.

(16) The securing portion 21m is provided generally at the lengthwise center of the opening 21e of the gear housing 21, which is centered in the longitudinal direction of the opening 21e of the gear housing 21. Therefore, the cover 13 is more effectively fixed without tilting relative to the gear housing 21. Accordingly, the opening 21e of the gear housing 21 is more effectively sealed with the cover 13.

(17) In the opening 21e of the gear housing 21, the gear housing 21 includes the projection 21n, which extends toward the yoke housing 4 and has the through hole 21j for receiving the screw 16 therethrough. The cover 13 has the engaging hole 13c to be engaged with the projection 21n. When the yoke housing 4 and the cover 13 are fixed to the gear housing 21 with the screw 16, the engaging hole 13c is engaged with the projection 21n having the through hole 21j for receiving the screw 16, thereby preventing presence of clearance or space between the screw 16 and the cover 13.

The above embodiment may be modified as follows.

Figure 9:
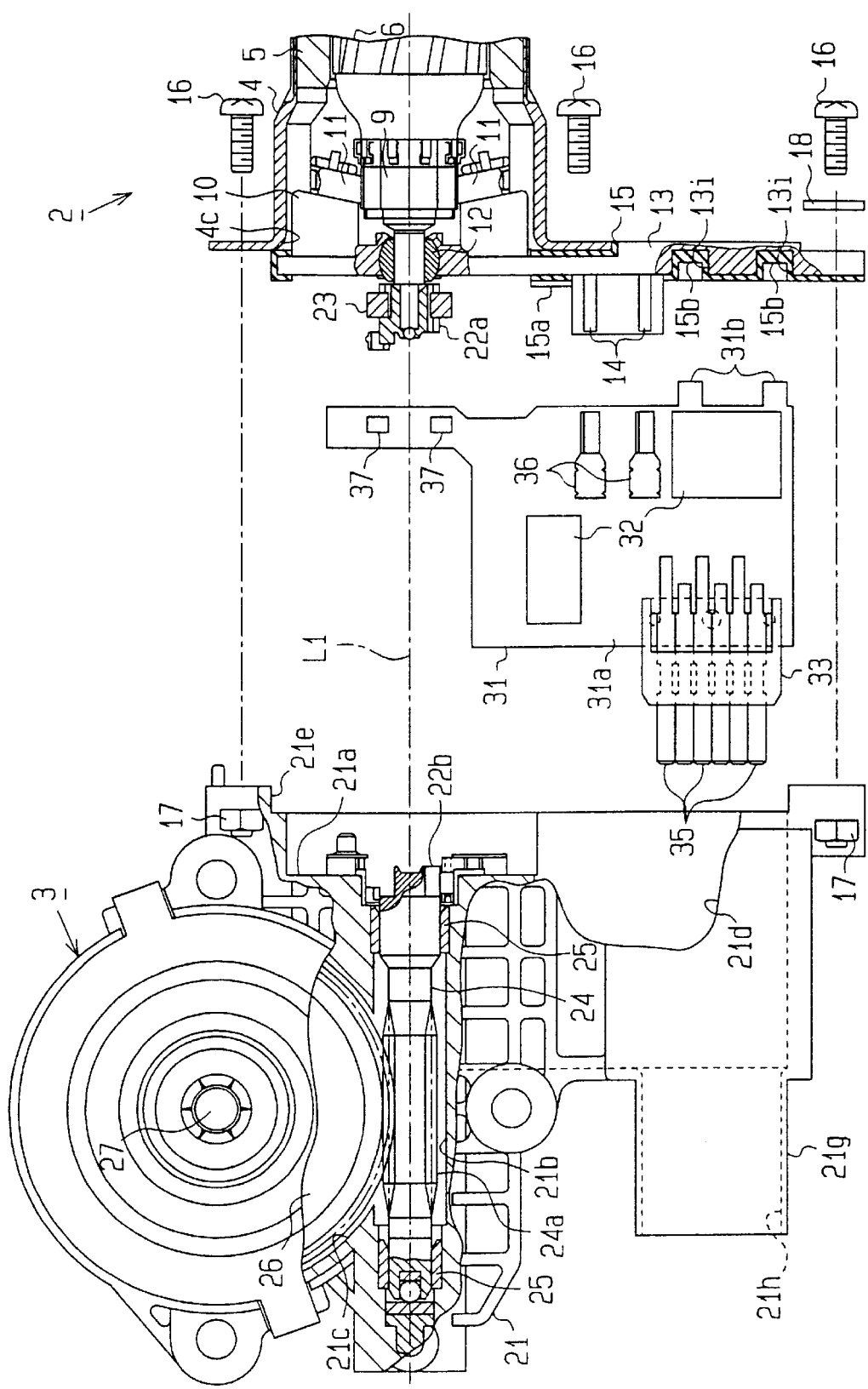
FIG. 9 is an exploded partial view, showing a modification of the motor.

As shown in FIG. 9, the control circuit board 31 described in the above embodiment can have clamping protrusions 31b to be clamped by a clamp device of an automatic assembling apparatus. In this way, it is possible to automatically assemble the circuit board 31 in the circuit board receiving portion 21d. In this case, recessed portions 13i, which correspond to the clamping protrusions 31b and are lined with the seal member 15, can be formed in the cover 13. The end surfaces of the clamping protrusions 31b are urged by bottom walls 15b of the recessed portions 13i in a direction away from the bottom walls 15b of the recessed portions 13i, thereby preventing rattling of the circuit board 13. Here, the bottom walls 15b act as pressing portions of the present invention.

In the above embodiment, the gear housing 21 and the cover 13 are protruded radially outward from the yoke housing 4 to fix the one lateral side of the cover 13 to the gear housing 21. Then, the cover 13 is fixed to the gear housing 21 at the protruded portion with the screws 16 and the nuts 17 through the metal pate 18. For example, it may be modified as shown in FIG. 10.

Figure 10:
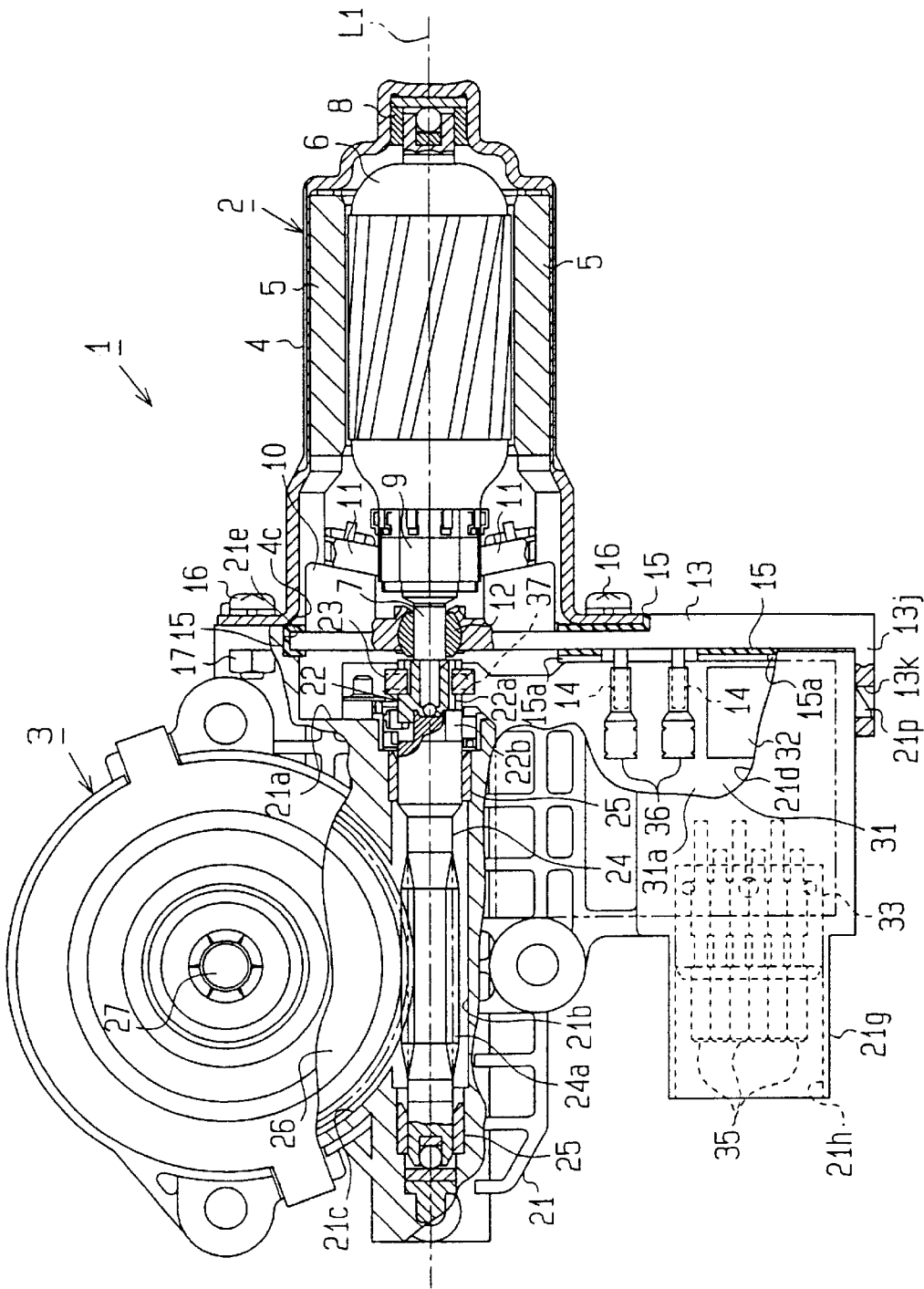
FIG. 10 is a schematic view, showing another modification of the motor.

As shown in FIG. 10, the cover 13 can include an extending piece 13j at the one lateral side of the cover 13. The extending piece 13j of the cover 13 extends in the direction parallel to the direction of the axis L1 on the gear housing 21 side of the cover 13. The extending piece 13j has an engaging through hole (cover-side engaging portion) 13k that penetrates through the extending piece 13j in the direction perpendicular to the direction of the axis L1. The gear housing 21 can have an engaging projection (housing-side engaging portion) 21p that engages with the engaging through hole 13k. The cover 13 is secured to the gear housing 21 at this position when the engaging through hole 13k of the cover 13 is engaged with the engaging projection 21p of the gear housing 21. In this way, components, such as the screws 16, the nuts 17, the metal plate 18 and the like, can be eliminated. Thus, the number of components can be reduced. Also, the tedious and time consuming assembling operation of these extra components can be eliminated. Further, the number of processes for assembling the extra components can be reduced, thereby allowing a reduction in a manufacturing cost. In the above embodiment, the gear housing 21 and the cover 13 are protruded radially outward to provide a space for arranging the screws 16, the nuts 17 and the metal plate 18, resulting in an increased radial size of the motor 1. On the other hand, as shown in FIG. 10, the cover 13 protrudes radially outward only for the thickness of the extending piece 13j. Therefore, the size of the motor 1 can be minimized.

In the above embodiment, the cover 13 is fixed to the gear housing 21 after the control circuit board 31 is installed in the gear housing 21. For example, this arrangement may be modified as shown in FIG. 11.

Figure 11:
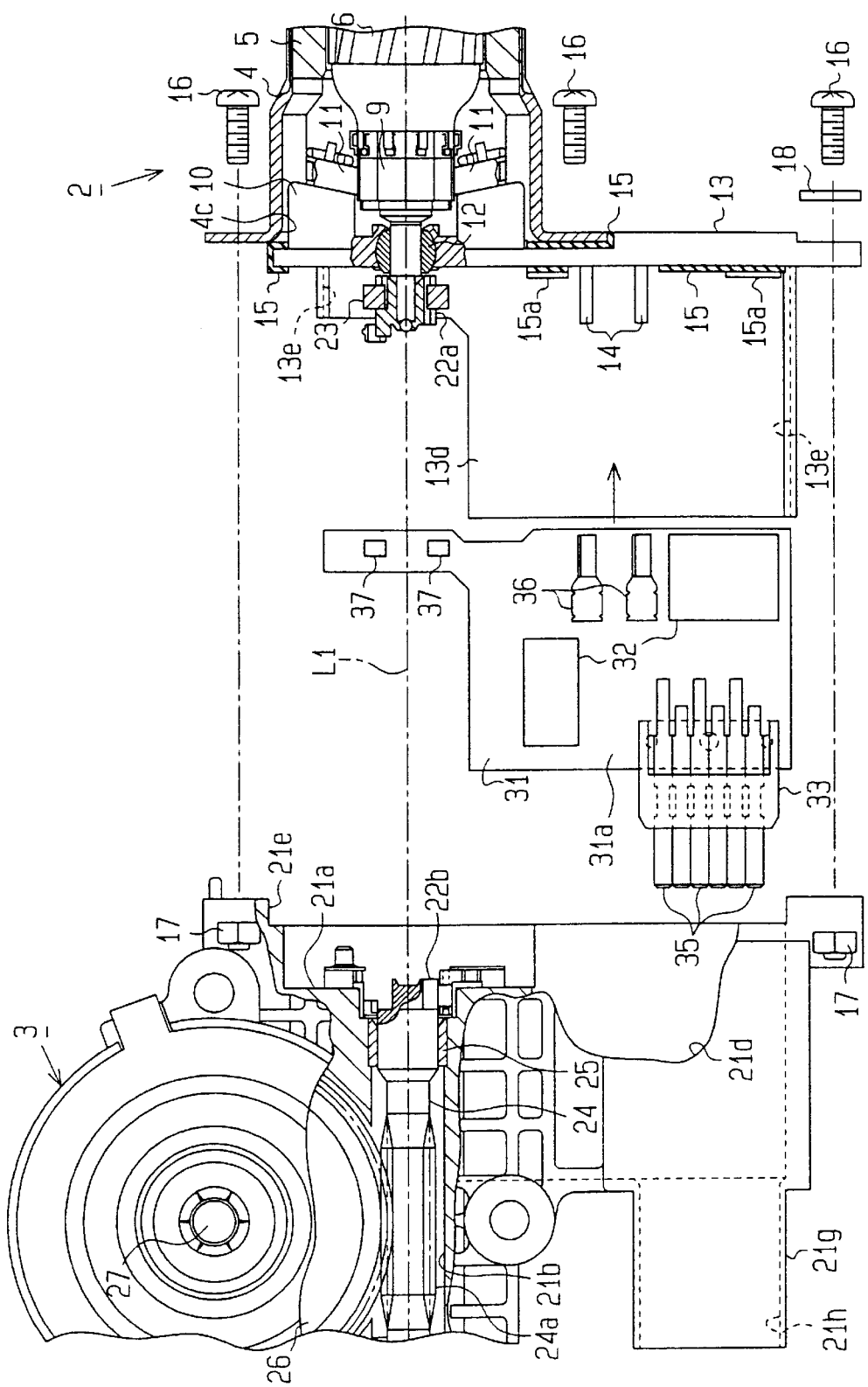
FIG. 11 is an exploded partial view, showing a further modification of the motor.

As shown in FIG. 11, the cover 13 has a circuit board holding portion 13d, which is integrated in the cover 13 and has a size substantially the same as that of the control circuit board 31. The circuit board holding portion 13d has a couple of guide grooves 13e at lateral sides thereof. The guide grooves 13e extend in the direction of the axis L1 and guide lateral edges of the control circuit board 31. The control circuit board 31 is inserted from distal ends of the guide grooves 13e (from left side to right side in FIG. 11). The female terminals 36 of the control circuit board 31 are electrically connected to the connecting pieces 14 of the cover 13. In this way, the control circuit board 31 is held by the circuit board holding portion 13d. In this case, it is necessary to increase a size of each guide groove 21f formed in the gear housing 21 to conform with a size of the circuit board holding portion 13d, or alternatively it is necessary to eliminate the guide grooves 21f. Therefore, the control circuit board 31 is firmly fixed to the circuit board holding portion 13d. Prior to installation of the control circuit board 31 in the gear housing 21, the control circuit board 31 is preinstalled in the circuit board holding portion 13d, and thus the female terminals 36 of the control circuit board 31 are connected to the connecting pieces 14 of the cover 13. Therefore, conditions of the connection between the female terminals 36 and the connecting pieces 14 can be checked before the motor unit 2 and the speed reducing unit 3 are assembled together. Accordingly, it is possible to assure the connection between the female terminals 36 and the connecting pieces 14.

In the above embodiment, the connector base portion 33 and the terminals 35 are fixed to the control circuit board 31. However, it may be modified as shown in FIG. 12.

Figure 12:
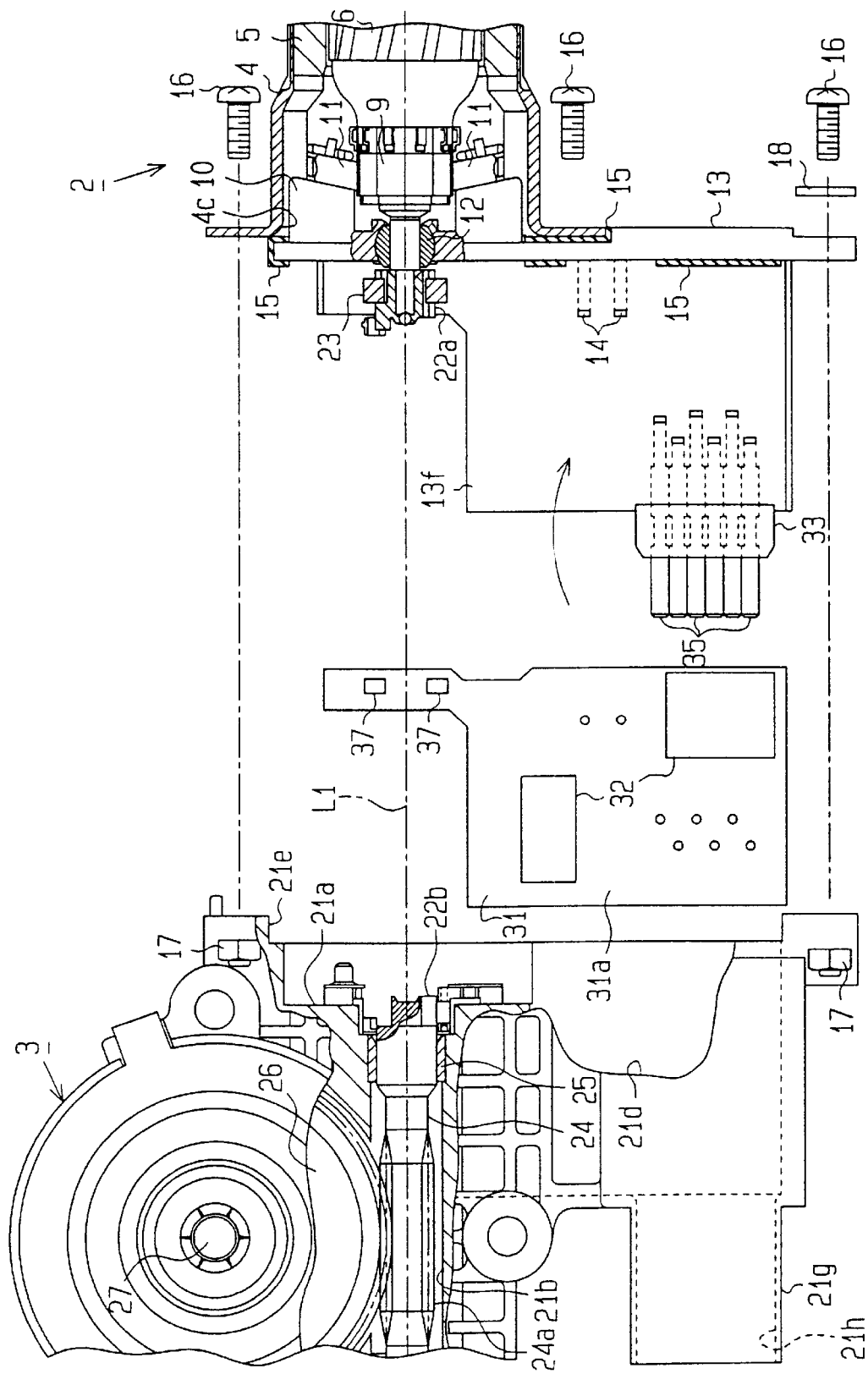
FIG. 12 is an exploded partial view, showing a further modification of the motor.

As shown in FIG. 12, the cover 13 has a circuit board holding portion 13f, which is integrated in the cover 13 and has a size substantially the same as that of the control circuit board 31. The circuit board holding portion 13f has the connector base portion 33 integrated therein. The terminals 35 are inserted through the connector base portion 33 and extend into the circuit board holding portion 13f. One end of each terminal 35 extends from a top surface of the circuit board holding portion 13f generally in a direction perpendicular to a plane of the top surface of the circuit board holding portion 13f. Thus, the connector base portion 33 and the terminals 35 of the above embodiment are eliminated form the control circuit board 31 in this instance. The connecting pieces 14, which are electrically connected to the corresponding brushes 11, extend into the circuit board holding portion 13f. One end of each connecting piece 14 extends from the top surface of the circuit board holding portion 13f generally in the direction perpendicular to the plane of the top surface of the circuit board holding portion 13f. The control circuit board 31 is mounted on the top surface of the circuit board holding portion 13f and is electrically connected to the one end of each terminal 35 and the one end of each connecting piece 14, which extend from the top surface of the circuit board holding portion 13f in the direction perpendicular to the plane of the top surface of the circuit board holding portion 13f. Thus, the control circuit board 31 is held by the circuit board holding portion 13f. In this manner, similar to the embodiment discussed with reference to FIG. 11, the control circuit board 31 is preinstalled in the cover 13. Further, in this case, the connector base portion 33 and the terminals 35 of the control circuit board 31 are eliminated, thereby allowing a reduction of the size of the control circuit board 31.

In the above embodiment, the connector portion 21g is provided in the gear housing 21. For example, this arrangement can be modified as shown in FIG. 13.

Figure 13:
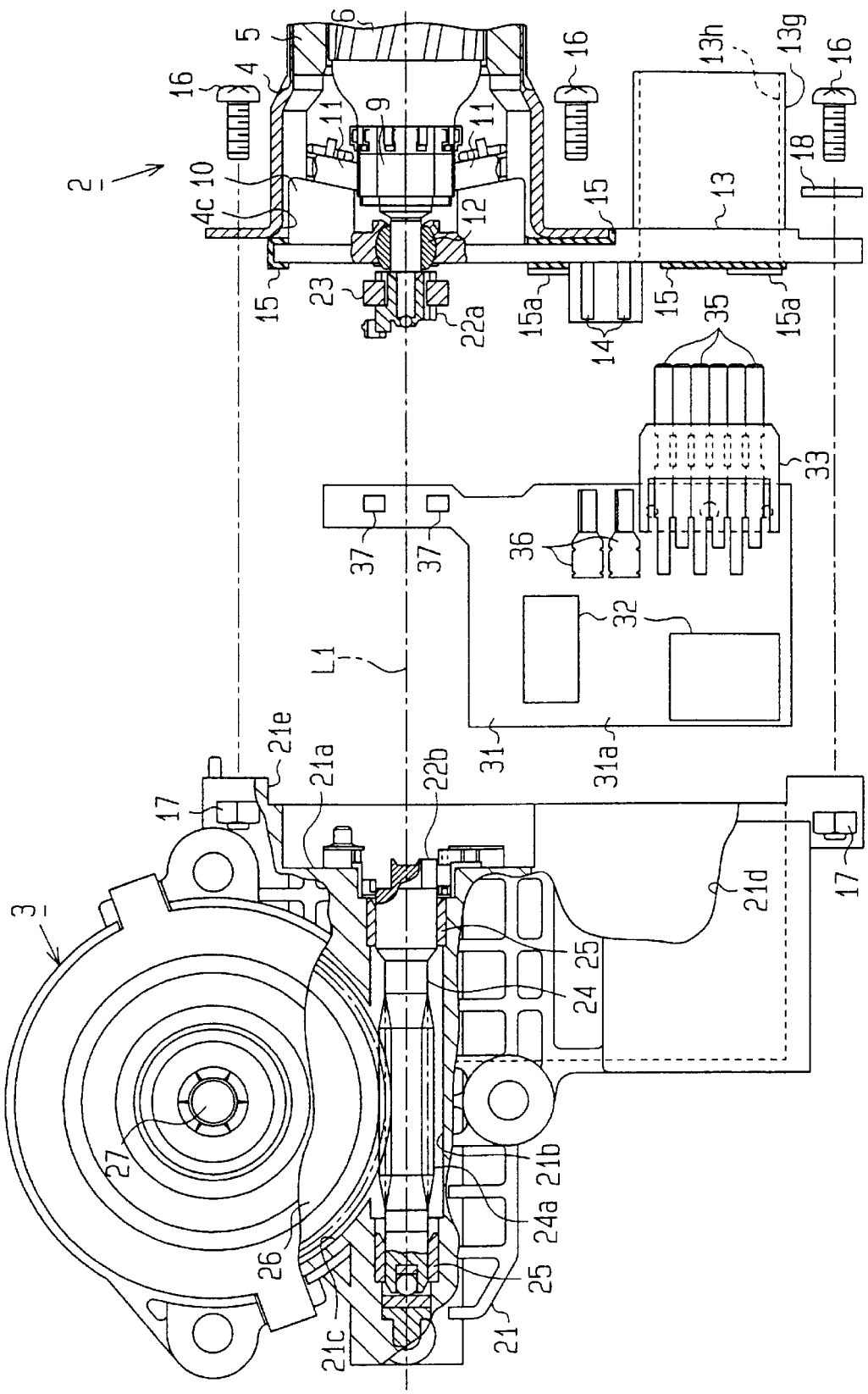
FIG. 13 is an exploded partial view, showing a further modification of the motor.

As shown in FIG. 13, the connector portion 21g is eliminated from the gear housing 21, and a connector portion 13g is provided in the cover 13. The connector portion 13g has an opening that is located on the motor unit 2 side of the cover 13. The connector portion 13g has a communicating hole 13h that communicates between the circuit board receiving portion 21d and the outside of the connector portion 13g. Locations of the connector base portion 33 and the terminals 35 of the control circuit board 31 are changed to face the motor unit 2, so that the connector base portion 33 is received in the communicating hole 13h of the connector portion 13g. The orientation of the opening of the connector portion 13g of the motor 1 can be changed in the above manner. Even with this arrangement, it is possible to accomplish the advantages similar to those describes in the above sections (8)–(10). In this instance, since the seal member 15 is provided on the cover 13, a waterproof structure of the connector portion 13g can be relatively easily achieved.

In the above embodiment, the two female terminals 36 are arranged on the control circuit board 31 and are aligned in a direction parallel to the plane of the control circuit board 31. For example, this arrangement can be modified as shown in FIGS. 14 and 15.

Figure 14:
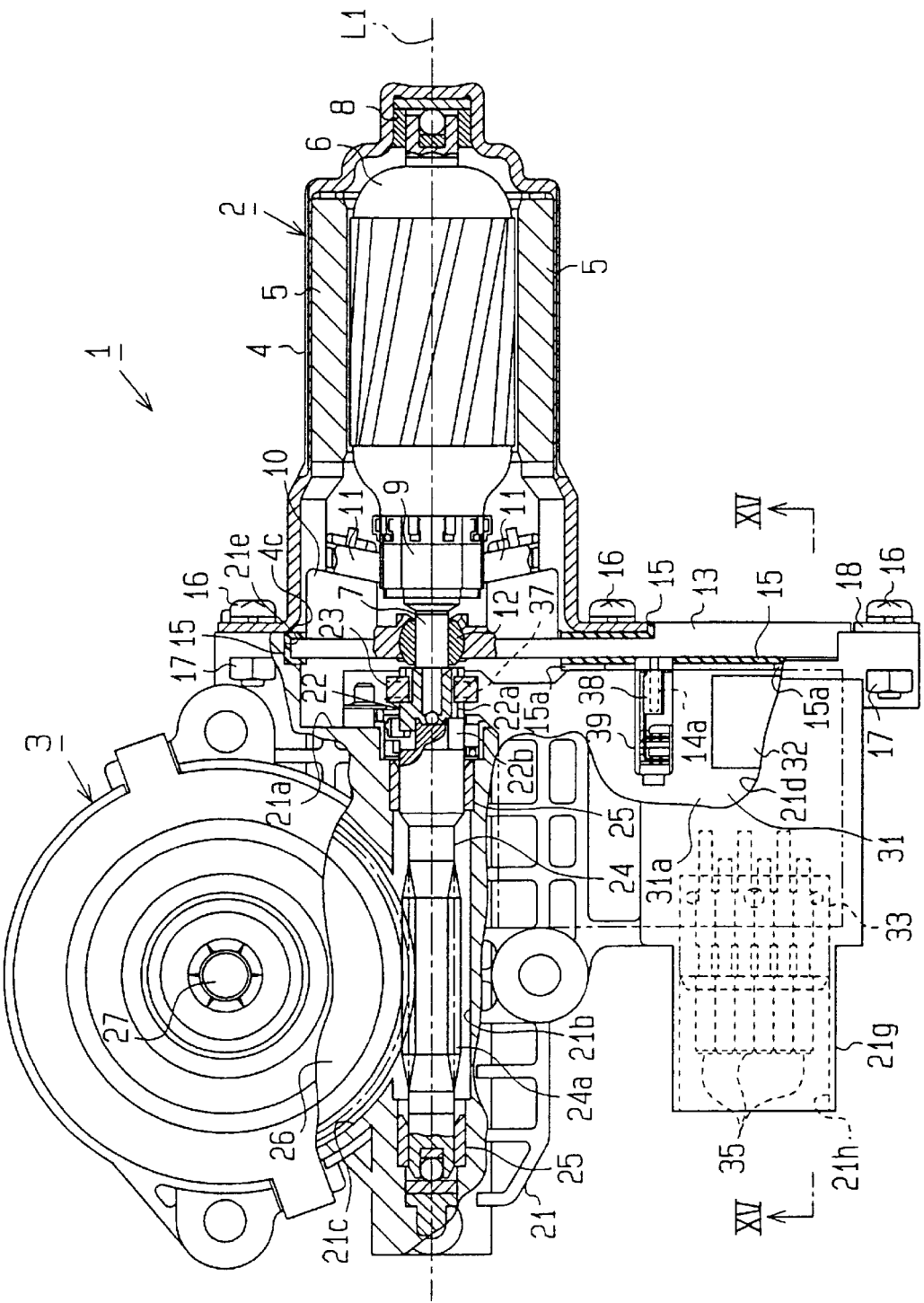
FIG. 14 is a schematic view, showing a further modification of the motor.
Figure 15:
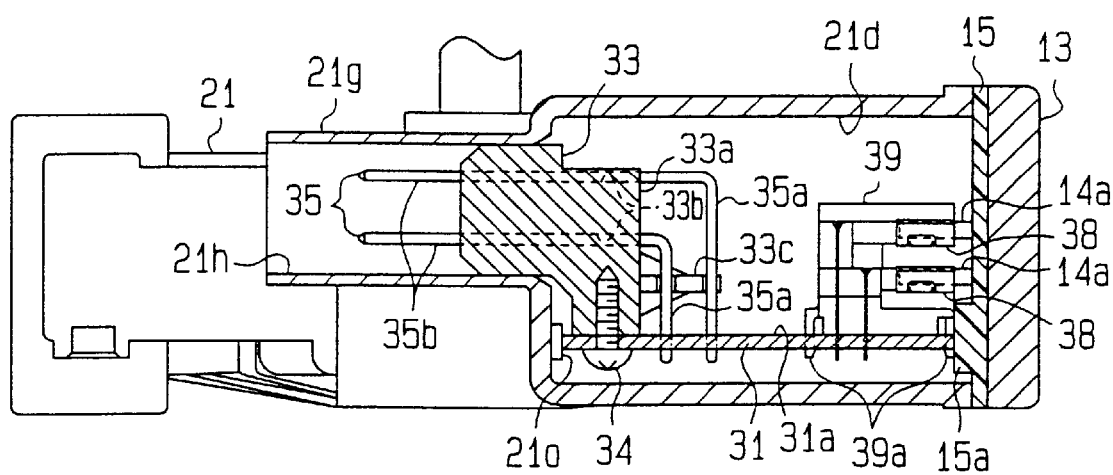
FIG. 15 is a partial cross-sectional view taken along line XV—XV in FIG. 14.

As shown in FIGS. 14 and 15, female terminals 38 are integrally assembled into a terminal case 39 in such a manner that the female terminals 38 are aligned in the direction perpendicular to the plane of the control circuit board 31. The terminal case 39 is provided with hooks 39a. The hooks 39a are engaged with the control circuit board 31 to fix the case 39 to the control circuit board 31. Similarly, the two connecting pieces 14a are molded integrally with the cover 13 in such a manner that the connecting pieces 14a are aligned in the direction perpendicular to the plane of the control circuit board 31. In this way, an accommodating space for accommodating the female terminals 38 can be reduced in the direction perpendicular to the direction of the axis L1, i.e., the direction parallel to the plane of the control circuit board 31, so that a size of the control circuit board 31 can be reduced in this direction, allowing the size reduction of the motor 1.

The yoke housing 4 (motor unit 2) of the above embodiment can be formed into a cylindrical-shape.

The shape of the gear housing 21 of the above embodiment can be changed to any other shape.

The shape of the cover 13 in the above embodiment is not limited to the above-described shape and can be modified to any other shape. Furthermore, the shape of the seal member 15 formed integrally with the cover 13 is not limited to the above-described shape and can be modified to any other shape. Moreover, the seal member 15 can be provided separately from the cover 13. For example, the seal member can be a packing that is assembled to the cover 13.

In the above embodiment, the end surface of the control circuit board 31 is resiliently urged by the pressing protrusions 15a integrally provided on the seal member 15, so that the control circuit board 31 is clamped between the pressing protrusions 15a and the bottom surface 21o of the circuit board receiving portion 21d. However, the pressing protrusions 15a may be eliminated. In this case, the control circuit board 31 can be clamped between a part of the cover 13, where the seal member is not provided, and the bottom surface 21o of the circuit board receiving portion 21d.

The clutch 22 may be eliminated. In this case, the rotatable shaft 7 and the worm shaft 24 can be integrated together.

In the above embodiment, the speed-reducing mechanism includes the worm 24a and the worm wheel 26. However, any other speed reducing gears can be used.

In the above embodiment, the Hall elements 37 and the sensor magnet 23 are used as a rotation detecting means for detecting the rotation of the rotatable shaft 7. However, magnetoresistive elements may be used in place of the Hall elements 37. Further, a detecting means other than the magnetic detecting-type may be used.

In the above embodiment, the female terminals 36 are provided on the circuit board 31, and the connecting pieces 14 are provided in the motor unit 2 (cover 13). Alternatively, the connecting pieces 14 can be provided on the circuit board 31, and the female terminals 36 can be provided in the motor unit 2.

In the above embodiment, the screws 16 are inserted into the corresponding through holes from the motor unit 2 side and are threadably engaged with the corresponding nuts 17. The positional relationship between each screw 16 and the corresponding nut 17 can be reversed. Further, in place of the through holes 21j formed in the gear housing 21, threaded holes can be formed in the gear hosing 21, and the screws 16 can be directly, threadably engaged with the threaded holes. Moreover, other fastening members may be used in place of the screws 16 and the nuts 17.

In the above embodiment, the securing portions of the screws 16 are provided as shown in FIGS. 3A to 3D. However, these securing portions may be modified in any other ways. The metal plate similar to the metal plate 18 may be commonly used for the predetermined securing portions in a manner similar to that of the above embodiment. Alternatively, the metal plate may be provided individually at each of the securing portions.

In the above embodiment, the metal plate 18 is temporarily fixed to the cover 13 by engaging the engaging claws 13b of the cover 13 with the engaging hole 18a of the metal plate 18. However, the metal plate 18 may be temporarily fixed to the cover 13 by any other ways. Further, a temporal fixing means can be provided between the gear housing 21 and the metal plate 18. Therefore, it may be possible to temporarily fix the metal plate 18 to the gear housing 21 after the cover 13 is fixed to the gear housing 21.

The cover 13 of the above embodiment may be changed to any other shape. For example, the engaging hole 13 may be replaced with a notch that extends from the outer peripheral edge of the cover 13. In this case, it is necessary to change the shape of the projection 21n to conform with the shape of the notch.

In the above embodiment, the terminals 35 are held by the connector base portion 33 by inserting them through the through holes 33b. However, the terminals 35 may be molded in the connector base portion 33 by insert molding.

In the above embodiment, the motor 1 is used as the drive source of the power window system of the vehicle. However, the motor 1 may be used as a drive source of any other devices or systems.

Additional advantages and modifications will readily occur to those skilled in the art. The invention in its broader terms is therefore, not limited to the specific details, representative apparatus, and illustrative examples shown and described.

What is claimed is:

1. A motor comprising:
   a motor unit that has:
   a yoke housing, which includes an opening;
   a rotatable shaft received in the yoke housing; and
   a cover installed in proximity to the opening of the yoke housing; and
   a speed reducing unit connected to the motor unit, the speed reducing unit including:
   a speed reducing mechanism for reducing rotational speed of the rotatable shaft;
   a generally planar control circuit board for controlling rotation of the motor unit; and
   a gear housing that includes a circuit board receiving portion having a bottom surface and an opening, wherein:
   the cover is positioned between the opening of the yoke housing and the opening of the gear housing to cover both the opening of the yoke housing and the opening of the gear housing;
   the opening of the gear housing faces the motor unit in an axial direction of the rotatable shaft and is communicated with the bottom surface of the circuit board receiving portion; and
   the control circuit board is inserted in the circuit board receiving portion of the gear housing through the opening of the gear housing in an axial direction of the rotatable shaft in such a manner that the control circuit board is clamped between the cover and the bottom surface of the circuit board receiving portion such that a plane of the control circuit board is generally parallel to an axis of the rotatable shaft when the motor unit and the speed reducing unit are assembled and connected together.

2. A motor according to claim 1, wherein:
   the speed reducing mechanism of the speed reducing unit includes a worm shaft arranged coaxially with the rotatable shaft and provided separately from the rotatable shaft; and
   the rotatable shaft and the worm shaft are arranged such that the rotatable shaft and the worm shaft are connected together in an integrally rotatable manner when the motor unit and the speed reducing unit are assembled and connected together.

3. A motor according to claim 2, wherein:
   the speed reducing mechanism of the speed reducing unit further includes a worm wheel meshed with the worm shaft;
   the gear housing further includes a worm wheel receiving portion that receives the worm wheel; and
   the circuit board receiving portion and the worm wheel receiving portion are arranged on opposed sides of a rotational axis of the rotatable shaft, respectively.

4. A motor according to claim 1, wherein:
   the motor unit includes a plurality of motor-side connecting terminals for receiving electrical power supply;
   the control circuit board includes a plurality of board-side connecting terminals electrically connected to the motor-side connecting terminals; and
   the motor-side connecting terminals and the board-side connecting terminals are arranged such that the motor-side connecting terminals and the board-side connecting terminals are electrically connected together when the motor unit and the speed reducing unit are assembled and connected together.

5. A motor according to claim 4, wherein the cover includes the motor-side connecting terminals.

6. A motor according to claim 5, wherein the motor-side connecting terminals are integrally molded with the cover.

7. A motor according to claim 5, wherein the at least one pressing portion is resilient.

8. A motor according to claim 4, wherein the cover has a circuit board holding portion that holds the control circuit board when the motor-side connecting terminals and the board-side connecting terminals are electrically connected together.

9. A motor according to claim 1, wherein:
   the yoke housing has a couple of opposed generally flat outer side surfaces that extend substantially parallel to one another; and
   the plane of the control circuit board extends generally parallel to the outer side surfaces of the yoke housing.

10. A motor according to claim 1, wherein:
    the gear housing further includes a rotatable shaft receiving portion that receives the rotatable shaft of the motor unit;
    the opening of the gear housing forms an opening of the circuit board receiving portion and also an opening of the rotatable shaft receiving portion; and
    the cover covers both the opening of the circuit board receiving portion and the opening of the rotatable shaft receiving portion.

11. A motor according to claim 1, wherein the motor unit includes a plurality of brush holders that are integrally formed with the cover.

12. A motor according to claim 1, further comprising a resilient seal member that forms a seal between the cover and the opening of the yoke housing and between the cover and the opening of the gear housing.

13. A motor according to claim 12, wherein the resilient seal member is integrally formed with the cover.

14. A motor according to claim 12, wherein the at least one pressing portion is integrally formed with the resilient seal member.

15. A motor according to claim 1, wherein the cover has at least one pressing portion that urges the control circuit board in a direction away from the at least one pressing portion when the motor unit and the speed reducing unit are assembled and connected together.

16. A motor according to claim 1, wherein:
    the gear housing includes at least one housing-side engaging portion;
    the cover includes at least one cover-side engaging portion; and
    the at least one housing-side engaging portion and the at least one cover-side engaging portion are engaged together, so that the cover is secured to the gear housing.

17. A motor according to claim 1, wherein the gear housing includes a connector portion, which is integrally formed with the gear housing and provides electrical power supply to the motor unit.

18. A motor according to claim 17, wherein the connector portion extends generally parallel to the axial direction of the rotatable shaft.

19. A motor according to claim 17, wherein the connector portion of the gear housing is continuously formed with the circuit board receiving portion of the gear housing.

20. A motor according to claim 1, wherein the cover includes a connector portion, which is integrally formed with the cover and provides electrical power supply to the motor unit.

21. A motor comprising:
a motor unit that has:
  a yoke housing, which includes an opening;
  a rotatable shaft, received in the yoke housing; and
  a cover installed in proximity to the opening of the yoke housing; and
a speed reducing unit connected to the motor unit, the speed reducing unit including:
  a speed reducing mechanism for reducing rotational speed of the rotatable shaft;
  a generally planar control circuit board for controlling rotation of the motor unit; and
  a gear housing that includes a circuit board receiving portion and an opening, wherein:
    the cover is positioned between the opening of the yoke housing and the opening of the gear housing to cover both the opening of the yoke housing and the opening of the gear housing;
    the opening of the gear housing faces the motor unit in an axial direction of the rotatable shaft and is communicated with the circuit board receiving portion;
    the control circuit board is inserted in the circuit board receiving portion of the gear housing through the opening of the gear housing in an axial direction of the rotatable shaft in such a manner that the control circuit board is clamped between the cover and the circuit board receiving portion such that a plane of the control circuit board is generally parallel to an axis of the rotatable shaft when the motor unit and the speed reducing unit are assembled and connected together;
    the cover includes a plurality of motor-side connecting terminals for receiving electrical power supply to the motor unit; and
    the control circuit board includes a plurality of board-side connecting terminals electrically connected to the motor-side connecting terminals.

22. A motor according to claim 21, wherein the motor unit includes a plurality of brush holders that are integrally formed with the cover.

23. A motor according to claim 21, wherein the motor-side connecting terminals are integrally molded with the cover.

24. A motor according to claim 21, wherein:
the gear housing includes at least one housing-side engaging portion;
the cover includes at least one cover-side engaging portion; and
the at least one housing-side engaging portion and the at least one cover-side engaging portion are engaged together, so that the cover is secured to the gear housing.

25. A motor according to claim 21, wherein the cover has a circuit board holding portion that holds the control circuit board when the motor-side connecting terminals and the board-side connecting terminals are electrically connected together.

26. A motor according to claim 21, wherein the cover includes a connector portion, which is integrally formed with the cover and provides electrical power supply to the motor unit.

27. A motor according to claim 21, wherein:
the yoke housing has a couple of opposed generally flat outer side surfaces that extend substantially parallel to one another; and
the plane of the control circuit board extends generally parallel to the outer side surfaces of the yoke housing.

28. A motor according to claim 21, wherein:
the gear housing further includes a rotatable shaft receiving portion that receives the rotatable shaft of the motor unit;
the opening of the gear housing forms an opening of the circuit board receiving portion and also an opening of the rotatable shaft receiving portion; and
the cover covers both the opening of the circuit board receiving portion and the opening of the rotatable shaft receiving portion.

29. A motor according to claim 21, further comprising a resilient seal member, that forms a seal between the cover and the opening of the yoke housing and also seals between the cover and the opening of the gear housing.

30. A motor according to claim 29, wherein the resilient seal member is integrally formed with the cover.

31. A motor according to claim 21, wherein the cover has at least one pressing portion that urges the control circuit board in a direction away from the at least one pressing portion when the motor unit and the speed reducing unit are assembled and connected together.

32. A motor according to claim 31, wherein the at least one pressing portion is resilient.

33. A motor according to claim 31, wherein the at least one pressing portion is integrally formed with the resilient seal member.

34. A motor according to claim 21, wherein the gear housing includes a connector portion, which is integrally formed with the gear housing and provides electrical power supply to the motor unit.

35. A motor according to claim 34, wherein the connector portion extends generally parallel to the axial direction of the rotatable shaft.

36. A motor according to claim 34, wherein the connector portion of the gear housing is continuously formed with the circuit board receiving portion of the gear housing.

37. A motor according to claim 21, wherein:
the speed reducing mechanism of the speed reducing unit includes a worm shaft, which is arranged coaxially with the rotatable shaft and is provided separately from the rotatable shaft; and
the rotatable shaft and the worm shaft are arranged such that the rotatable shaft and the worm shaft are connected together in an integrally rotatable manner when the motor unit and the speed reducing unit are assembled and connected together.

38. A motor according to claim 37, wherein:
the rotatable shaft and the worm shaft are connected together through a clutch; and
the clutch transmits rotational force of the rotatable shaft to the worm shaft and prevents transmission of rotational force of the worm shaft to the rotatable shaft.

39. A motor comprising:
a motor unit that has:
  a yoke housing that includes an opening;
  a rotatable shaft received in the yoke housing; and
  a cover installed to the opening of the yoke housing; and
a speed reducing unit connected to the motor unit, the speed reducing unit including:
  a speed reducing mechanism for reducing rotational speed of the rotatable shaft, wherein the speed reducing mechanism includes a worm shaft arranged coaxially with the rotatable shaft and provided separately from the rotatable shaft;
  a generally planar control circuit board for controlling rotation of the motor unit; and a gear housing that includes a circuit board receiving portion and an opening, wherein:

the cover is positioned between the opening of the yoke housing and the opening of the gear housing to cover both the opening of the yoke housing and the opening of the gear housing;

the opening of the gear housing faces the motor unit in an axial direction of the rotatable shaft;

the rotatable shaft and the worm shaft are arranged such that the rotatable shaft and the worm shaft are connected together in an integrally rotatable manner when the motor unit and the speed reducing unit are assembled and connected together; and the control circuit board is inserted in the circuit board receiving portion of the gear housing through the opening of the gear housing in an axial direction of the rotatable shaft in such a manner that the control circuit board is arranged between the circuit board receiving portion and the cover such that a plane of the control circuit board is generally parallel to an axis of the rotatable shaft when the motor unit and the speed reducing unit are assembled and connected together.

40. A motor according to claim 39, further comprising a clutch connects between the rotatable shaft and the worm shaft, wherein the clutch transmits rotational force of the rotatable shaft to the worm shaft and prevents transmission of rotational force of the worm shaft to the rotatable shaft.

41. A motor according to claim 39, wherein:

the speed reducing mechanism of the speed reducing unit further includes a worm wheel meshed with the worm shaft;

the gear housing further includes a worm wheel receiving portion that receives the worm wheel; and the circuit board receiving portion and the worm wheel receiving portion are arranged on opposed sides of a rotational axis of the rotatable shaft, respectively.

42. The motor according to claim 39, wherein:

the motor unit includes a plurality of motor-side connecting terminals for receiving electrical power supply;

the control circuit board includes a plurality of board-side connecting terminals electrically connected to the motor-side containing terminals; and the motor-side connecting terminals and the board-side connecting terminals are arranged such that the motor-side connecting terminals and the board-side connecting terminals are electrically connected together when the motor unit and the speed reducing unit are assembled and connected together.

43. A motor according to claim 42, wherein the cover has a circuit board holding portion that holds the control circuit board when the motor-side connecting terminals and the board-side connecting terminals are electrically connected together.

44. A motor according to claim 42, wherein the cover includes the motor-side connecting terminals.

45. A motor according to claim 44, wherein the motor-side connecting terminals are integrally molded with the cover.

46. A motor according to claim 39, wherein:

the yoke housing has a couple of opposed generally flat outer side surfaces that extend substantially parallel to one another; and the plane of the control circuit board extends generally parallel to the outer side surfaces of the yoke housing.

47. A motor according to claim 39, wherein:

the gear housing further includes a rotatable shaft receiving portion that receives the rotatable shaft of the motor unit;

the opening of the gear housing forms an opening of the circuit board receiving portion and also an opening of the rotatable shaft receiving portion; and the cover both the opening of the circuit board receiving portion and the opening of the rotatable shaft receiving portion.

48. A motor according to claim 39, wherein the motor unit includes a plurality of brush holders that are integrally formed with the cover.

49. The motor according to claim 39, further comprising a resilient seal member that forms a seal between the cover and the opening of the yoke housing and between the cover and the opening of the gear housing.

50. A motor according to claim 39, wherein the cover has at least one pressing portion that urges the control circuit board in a direction away from the at least one pressing portion when the motor unit and the speed reducing unit are assembled and connected together.

51. A motor according to claim 39, wherein:

the gear housing includes at least one housing-side engaging portion;

the cover includes at least one cover-side engaging portion; and the at least one housing-side engaging portion and the at least one cover-side engaging portion are engaged together, so that the cover is secured to the gear housing.

52. A motor according to claim 39, wherein the gear housing includes a connector portion, which is integrally formed with the gear housing and provides electrical power supply to the motor unit.

53. A motor according to claim 52, wherein the connector portion extends generally parallel to the axial direction of the rotatable shaft.

54. A motor according to claim 52, wherein the connector portion of the gear housing is continuously formed with the circuit board receiving portion of the gear housing.

55. A motor according to claim 39, wherein the cover includes a connector portion, which is integrally formed with the cover and provides electrical power supply to the motor unit.

56. A motor comprising:

a motor unit that has a rotatable shaft; and a speed reducing unit connected to the motor unit, the speed reducing unit including:

a speed reducing mechanism for reducing rotational speed of the rotatable shaft;

a control circuit board for controlling rotation of the motor unit; and a gear housing that includes a circuit board receiving portion and an opening, wherein:

the opening of the gear housing faces the motor unit and is communicated with the circuit board receiving portion;

the control circuit board is inserted in the circuit board receiving portion of the gear housing through the opening of the gear housing in an axial direction of the rotatable shaft in such a manner that the control circuit board is clamped between the motor unit and the speed reducing unit when the motor unit and the speed reducing unit are assembled and connected together;

the speed reducing mechanism of the speed reducing unit includes a worm shaft arranged coaxially with the rotatable shaft;

the rotatable shaft and the worm shaft are arranged such that the rotatable shaft and the worm shaft are connected together when the motor unit and the speed reducing unit are assembled and connected together; and the rotatable shaft and the worm shaft are connected together through a clutch, which transmits rotational force of the rotatable shaft to the worm shaft and prevents transmission of rotational force of the worm shaft to the rotatable shaft.

57. A motor comprising:

a motor unit that has:
- a yoke housing, which includes an opening;
- a rotatable shaft, which is received in the yoke housing; and
- a cover, which is installed to the opening of the yoke housing; and a speed reducing unit connected to the motor unit, the speed reducing unit including:
- a speed reducing mechanism for reducing rotational speed of the rotatable shaft;
- a generally planar control circuit board for controlling rotation of the motor unit; and
- a gear housing that includes a circuit board receiving portion and an opening, wherein:

the cover is positioned between the opening of the yoke housing and the opening of the gear housing to cover both the opening of the yoke housing and the opening of the gear housing;

the opening of the gear housing faces the motor unit in an axial direction of the rotatable shaft;

the circuit board receiving portion has at least one guide groove, which extends parallel to an axis of the rotatable shaft; and the control circuit board is inserted in the circuit board receiving portion of the gear housing through the opening of the gear housing in an axial direction of the rotatable shaft such that the control circuit board is guided by the at least one guide groove when the motor unit and the speed reducing unit are assembled and connected together.

58. A motor comprising:

a motor unit that has:
- a yoke housing, which includes an opening;
- a rotatable shaft, which is received in the yoke housing; and
- a cover, which is installed to the opening of the yoke housing and includes a circuit board holding portion, wherein the circuit board holding portion includes at least one guide groove that extends parallel to an axis of the rotatable shaft; and a speed reducing unit connected to the motor unit, the speed reducing unit including:
- a speed reducing mechanism for reducing rotational speed of the rotatable shaft;
- a generally planar control circuit board for controlling rotation of the motor unit; and
- a gear housing that has a circuit board receiving portion and an opening, wherein:

the cover is positioned between the opening of the yoke housing and the opening of the gear housing to cover both the opening of the yoke housing and the opening of the gear housing;

the opening of the gear housing faces the motor unit in the axial direction of the rotatable shaft; and the control circuit board is inserted in the circuit board holding portion of the cover and is also inserted in the circuit board receiving portion of the gear housing when the motor unit and the speed reducing unit are assembled and connected together, wherein the control circuit board is inserted in the circuit board holding portion of the cover such that the control circuit board is guided by the at least one guide groove of the circuit board holding portion of the cover.

* * * * *